(12) United States Patent
Allen

(10) Patent No.: US 12,021,861 B2
(45) Date of Patent: Jun. 25, 2024

(54) IDENTITY VERIFICATION THROUGH MULTISYSTEM COOPERATION

(71) Applicant: BANK OF AMERICA CORPORATION, Charlotte, NC (US)

(72) Inventor: Morgan S. Allen, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 558 days.

(21) Appl. No.: 17/140,726

(22) Filed: Jan. 4, 2021

(65) Prior Publication Data

US 2022/0217136 A1    Jul. 7, 2022

(51) Int. Cl.
*H04L 9/40*     (2022.01)

(52) U.S. Cl.
CPC .... *H04L 63/0853* (2013.01); *H04L 2463/102* (2013.01)

(58) Field of Classification Search
None
See application file for complete search history.

(56) References Cited

U.S. PATENT DOCUMENTS

| | | | | |
|---|---|---|---|---|
| 5,148,481 A | * | 9/1992 | Abraham | H04L 63/102 708/250 |
| 5,307,483 A | * | 4/1994 | Knipfer | G06F 15/8007 714/10 |
| 5,604,791 A | * | 2/1997 | Lee | H04M 1/658 379/142.12 |
| 5,613,012 A | * | 3/1997 | Hoffman | G06Q 20/12 235/380 |
| 5,615,277 A | * | 3/1997 | Hoffman | G06F 21/83 902/3 |
| 5,649,462 A | * | 7/1997 | Cucchi | B23Q 1/763 82/164 |
| 5,678,046 A | * | 10/1997 | Cahill | G06Q 40/02 707/999.009 |

(Continued)

OTHER PUBLICATIONS

Ren et al "Potential Identity Resolution Systems for the Industrial Internet of Things: A Survey," IEEE Communications Surveys & Tutorials, vol. 23, No. 1, First Quarter, pp. 391-430 (Year: 2020).*

(Continued)

*Primary Examiner* — Luu T Pham
*Assistant Examiner* — James J Wilcox

(57) ABSTRACT

A system includes first and second subsystems. The first subsystem receives a validation number request, transmitted by a first device in response to the entry of an account number into a first field of a webpage. In response to receiving the request, the first subsystem randomly generates the validation number, stores a copy in memory, and transmits it to a second device. The second subsystem receives a transaction request that includes the validation number from the first device, and transmits the received number to the first subsystem. The first device transmitted the request in response to the second device receiving the validation number and its subsequent entry into a second field of the webpage displayed on the first device. In response to receiving the validation number, the first subsystem determines that it matches the stored copy and transmits a message to the second subsystem authorizing the transaction.

17 Claims, 3 Drawing Sheets

(56) References Cited

U.S. PATENT DOCUMENTS

| | | | | |
|---|---|---|---|---|
| 5,764,789 A * | 6/1998 | Pare, Jr. | G06Q 20/10 | 382/224 |
| 5,802,199 A * | 9/1998 | Pare, Jr. | H04L 63/04 | 382/224 |
| 5,805,719 A * | 9/1998 | Pare, Jr. | G07C 9/37 | 382/224 |
| 5,870,723 A * | 2/1999 | Pare, Jr. | G06Q 20/341 | 705/39 |
| 5,903,721 A * | 5/1999 | Sixtus | H04L 9/40 | 726/2 |
| 5,913,196 A * | 6/1999 | Talmor | H04L 63/0861 | 704/E17.003 |
| 6,017,765 A * | 1/2000 | Yamada | G01N 27/44782 | 204/604 |
| 6,134,326 A * | 10/2000 | Micali | H04L 63/0823 | 380/30 |
| 6,137,884 A * | 10/2000 | Micali | G06Q 20/3825 | 713/180 |
| 6,141,750 A * | 10/2000 | Micali | H04L 9/3247 | 713/168 |
| 6,154,879 A * | 11/2000 | Pare, Jr. | G06Q 20/12 | 902/4 |
| 6,185,683 B1 * | 2/2001 | Ginter | G07F 9/026 | 705/52 |
| 6,289,513 B1 * | 9/2001 | Bentwich | G06F 40/58 | 706/45 |
| 6,317,783 B1 * | 11/2001 | Freishtat | H04L 67/56 | 707/999.01 |
| 6,335,927 B1 * | 1/2002 | Elliott | H04L 41/5003 | 370/352 |
| 6,343,361 B1 * | 1/2002 | Nendell | H04L 63/0428 | 380/278 |
| 6,363,358 B1 * | 3/2002 | Palmer | G06Q 20/202 | 705/28 |
| 6,366,682 B1 * | 4/2002 | Hoffman | G06Q 20/4097 | 382/115 |
| 6,396,482 B1 * | 5/2002 | Griffin | G06F 1/1664 | 345/169 |
| 6,434,379 B1 * | 8/2002 | Despres | H04M 15/705 | 455/406 |
| 6,438,550 B1 * | 8/2002 | Doyle | G06F 21/34 | 707/769 |
| 6,557,168 B1 * | 4/2003 | Czajkowski | G06F 9/4488 | 713/375 |
| 6,567,974 B1 * | 5/2003 | Czajkowski | G06F 9/44563 | 717/161 |
| 6,587,853 B1 * | 7/2003 | LaRue | G06N 5/04 | 707/999.009 |
| 6,609,125 B1 * | 8/2003 | Layne | G06Q 40/02 | 707/999.005 |
| 6,690,930 B1 * | 2/2004 | Dupre | H04W 8/245 | 455/411 |
| 6,705,517 B1 * | 3/2004 | Zajkowski | G06Q 20/00 | 705/72 |
| 6,851,114 B1 * | 2/2005 | Czajkowski | G06F 9/445 | 718/107 |
| 6,901,586 B1 * | 5/2005 | Czajkowski | G06F 9/445 | 718/107 |
| 7,020,658 B1 * | 3/2006 | Hill | G06F 16/10 | 707/999.102 |
| 7,113,962 B1 * | 9/2006 | Kee | G06F 16/182 | |
| 7,202,773 B1 * | 4/2007 | Oba | H04L 63/0853 | 713/168 |
| 7,209,903 B1 * | 4/2007 | Mamdani | G06Q 20/04 | 705/64 |
| 7,240,036 B1 * | 7/2007 | Mamdani | H04L 63/0861 | 705/64 |
| 7,379,921 B1 * | 5/2008 | Kiliccote | H04L 63/18 | 705/75 |
| 7,533,335 B1 * | 5/2009 | Sawicki | G06F 40/123 | 715/239 |
| 7,933,589 B1 * | 4/2011 | Mamdani | H04L 63/0861 | 455/414.1 |
| 7,941,197 B2 * | 5/2011 | Jain | G06Q 20/3226 | 379/433.05 |
| 8,024,235 B2 * | 9/2011 | Mathew | G06F 16/242 | 705/26.81 |
| 8,109,444 B2 * | 2/2012 | Jain | G06Q 20/3574 | 235/487 |
| 8,161,527 B2 * | 4/2012 | Curren | G06F 21/6227 | 726/28 |
| 8,341,083 B1 * | 12/2012 | Jain | G06Q 20/325 | 705/41 |
| 8,370,911 B1 * | 2/2013 | Mallard | G07C 9/28 | 713/185 |
| 8,381,999 B2 * | 2/2013 | Jain | G06Q 40/00 | 235/487 |
| 8,407,768 B1 * | 3/2013 | Hayter | H04L 63/0853 | 726/5 |
| 8,423,476 B2 | 4/2013 | Bishop et al. | | |
| 8,538,863 B1 * | 9/2013 | Saunders | G06Q 20/342 | 705/38 |
| 8,548,540 B2 * | 10/2013 | Jain | G06Q 20/341 | 455/575.8 |
| 8,561,142 B1 * | 10/2013 | Sobel | H04L 63/107 | 713/156 |
| 8,561,892 B2 | 10/2013 | Hayhow et al. | | |
| 8,660,955 B2 | 2/2014 | Ledbetter et al. | | |
| 8,689,296 B2 * | 4/2014 | Shewchuk | G06F 21/33 | 726/6 |
| 8,739,260 B1 * | 5/2014 | Damm-Goossens | H04L 9/3226 | 726/4 |
| 8,745,718 B1 * | 6/2014 | Dufel | H04L 63/20 | 726/8 |
| 8,762,279 B2 | 6/2014 | Weller et al. | | |
| 8,762,529 B1 * | 6/2014 | Payne | H04L 9/321 | 709/225 |
| 8,781,966 B2 | 7/2014 | Blair et al. | | |
| 8,793,184 B2 * | 7/2014 | Lakshminarayanan | G06Q 20/02 | 235/379 |
| 8,806,582 B2 * | 8/2014 | Dietrich | H04L 63/0853 | 726/4 |
| 8,818,983 B1 * | 8/2014 | Truong | G06F 16/951 | 707/706 |
| 8,851,366 B2 | 10/2014 | Modi | | |
| 8,885,894 B2 | 11/2014 | Rowen et al. | | |
| 8,918,854 B1 * | 12/2014 | Giobbi | G02B 6/0038 | 726/9 |
| 9,016,589 B2 * | 4/2015 | Jain | G06Q 20/3223 | 235/487 |
| 9,032,498 B1 * | 5/2015 | Ben Ayed | G06F 21/35 | 726/9 |
| 9,038,157 B1 * | 5/2015 | Santiago, Jr. | G06F 21/35 | 726/9 |
| 9,077,713 B1 * | 7/2015 | Zheng | G06F 21/30 | |
| 9,110,679 B1 * | 8/2015 | Chan | G06F 21/572 | |
| 9,191,217 B2 * | 11/2015 | Martell | H04L 12/1453 | |
| 9,210,156 B1 * | 12/2015 | Little | G06F 21/34 | |
| 9,231,925 B1 * | 1/2016 | Lundström | H04L 9/30 | |
| 9,240,992 B2 * | 1/2016 | Dietrich | H04L 63/0823 | |
| 9,251,538 B1 * | 2/2016 | Shakkarwar | H04L 67/02 | |
| 9,277,049 B1 * | 3/2016 | Danis | H04M 3/54 | |
| 9,294,475 B2 * | 3/2016 | Hoyos | H04L 63/0861 | |
| 9,336,634 B2 | 5/2016 | Beenau et al. | | |
| 9,384,480 B2 * | 7/2016 | Jain | G06Q 20/341 | |
| 9,406,067 B1 | 8/2016 | Robinson et al. | | |
| 9,420,097 B2 * | 8/2016 | Perotti | H04M 3/493 | |
| 9,471,913 B1 * | 10/2016 | Kaptcan | G06Q 20/3221 | |
| 9,501,774 B2 | 11/2016 | Ashfield | | |
| 9,519,901 B1 * | 12/2016 | Dorogusker | G06Q 20/40145 | |
| 9,569,775 B2 | 2/2017 | Fisher et al. | | |
| 9,594,740 B1 * | 3/2017 | Reddy | G06F 40/232 | |
| 9,674,700 B2 * | 6/2017 | John Archibald | H04W 12/50 | |
| 9,736,147 B1 * | 8/2017 | Mead | G06F 21/31 | |
| 9,736,180 B2 * | 8/2017 | Baldwin | H04L 63/1416 | |
| 9,818,112 B2 | 11/2017 | Pirzadeh et al. | | |

(56) References Cited

U.S. PATENT DOCUMENTS

| | | | | |
|---|---|---|---|---|
| 9,846,689 B2* | 12/2017 | Perelman | | G06F 40/174 |
| 9,847,990 B1* | 12/2017 | de Boursetty | | H04L 9/3236 |
| 9,853,977 B1* | 12/2017 | Laucius | | H04L 63/0815 |
| 9,858,781 B1* | 1/2018 | Campero | | H04L 9/3242 |
| 9,888,377 B1* | 2/2018 | McCorkendale | | H04W 12/06 |
| 10,037,526 B2 | 7/2018 | Campos | | |
| 10,044,647 B1* | 8/2018 | Karp | | G06F 40/30 |
| 10,068,220 B2 | 9/2018 | Perlman | | |
| 10,109,159 B1* | 10/2018 | Shoemaker, Jr. | | A63F 9/0079 |
| 10,182,048 B1* | 1/2019 | Sabanayagam | | H04W 4/14 |
| 10,200,380 B2* | 2/2019 | Belz | | H04L 63/08 |
| 10,230,725 B2* | 3/2019 | Peterson | | H04L 63/029 |
| 10,270,771 B1* | 4/2019 | Tamanini | | H04L 63/0853 |
| 10,290,000 B2 | 5/2019 | Kenderov | | |
| 10,296,897 B1* | 5/2019 | Wu | | G06Q 20/351 |
| 10,304,054 B2 | 5/2019 | McNeal | | |
| 10,332,191 B1* | 6/2019 | Eckel | | G06Q 20/352 |
| 10,362,169 B1* | 7/2019 | Sanderlin | | H04M 3/493 |
| 10,395,244 B1* | 8/2019 | Mossler | | G06Q 20/3226 |
| 10,411,894 B1* | 9/2019 | Yavnilovich | | H04W 12/06 |
| 10,432,618 B1* | 10/2019 | Poder | | H04L 63/0861 |
| 10,462,080 B1* | 10/2019 | Jones | | G06F 16/906 |
| 10,523,708 B1* | 12/2019 | Ilincic | | H04W 12/06 |
| 10,524,429 B1* | 1/2020 | Tvetene | | A01G 20/15 |
| 10,541,996 B1* | 1/2020 | Choi | | H04L 63/0853 |
| 10,552,833 B2 | 2/2020 | Godard et al. | | |
| 10,560,845 B1* | 2/2020 | Manepalli | | H04L 63/08 |
| 10,574,689 B1* | 2/2020 | Hoyos | | H04L 63/145 |
| 10,580,009 B2 | 3/2020 | Snyder et al. | | |
| 10,614,442 B2 | 4/2020 | Gupta et al. | | |
| 10,623,403 B1* | 4/2020 | Gupta | | H04M 3/5166 |
| 10,623,961 B1* | 4/2020 | Manepalli | | H04W 12/06 |
| 10,642,715 B1* | 5/2020 | Simca | | G06F 11/3612 |
| 10,645,075 B1* | 5/2020 | Rafferty | | H04W 12/068 |
| 10,652,739 B1* | 5/2020 | Lilley | | H04W 4/20 |
| 10,657,754 B1* | 5/2020 | Osborn | | G06Q 20/352 |
| 10,665,244 B1* | 5/2020 | Gupta | | H04M 3/5166 |
| 10,666,793 B1* | 5/2020 | Gardner | | H04M 3/385 |
| 10,671,984 B2 | 6/2020 | Hayhow et al. | | |
| 10,679,453 B2 | 6/2020 | Dominguez et al. | | |
| 10,686,781 B1* | 6/2020 | Kaditz | | H04L 67/10 |
| 10,701,067 B1* | 6/2020 | Ziraknejad | | H04W 12/63 |
| 10,713,661 B2 | 7/2020 | Song et al. | | |
| 10,721,226 B1* | 7/2020 | Kurani | | H04L 63/0861 |
| 10,721,242 B1* | 7/2020 | Jones | | H04L 63/126 |
| 10,733,601 B1* | 8/2020 | Osborn | | G06Q 20/3227 |
| 10,755,277 B2 | 8/2020 | Shakkarwar | | |
| 10,783,576 B1* | 9/2020 | Van Os | | G06Q 20/3227 |
| 10,785,303 B2* | 9/2020 | Ghabour | | H04N 1/00437 |
| 10,796,017 B1* | 10/2020 | Azaroff | | H04L 63/0853 |
| 10,810,816 B1* | 10/2020 | Kocher | | H04L 63/0853 |
| 10,853,795 B1* | 12/2020 | Capurso | | G06Q 20/4014 |
| 10,873,575 B2* | 12/2020 | Herget | | H04L 63/18 |
| 10,891,610 B2* | 1/2021 | Powell | | G06Q 20/12 |
| 10,915,891 B1* | 2/2021 | Winklevoss | | H04L 9/3255 |
| 10,932,403 B1* | 3/2021 | Tvetene | | A01B 45/00 |
| 10,993,387 B1* | 5/2021 | Tvetene | | B66F 9/0755 |
| 10,997,592 B1* | 5/2021 | Kurani | | G06Q 20/3821 |
| 11,006,154 B2* | 5/2021 | McSchooler | | H04N 21/23418 |
| 11,017,464 B1* | 5/2021 | Harris | | H04L 63/1416 |
| 11,023,968 B2* | 6/2021 | Arnold | | G06Q 40/04 |
| 11,044,246 B1* | 6/2021 | Freeling | | G06Q 30/0601 |
| 11,051,163 B1* | 6/2021 | Smith | | H04L 63/0876 |
| 11,063,931 B2* | 7/2021 | Johri | | H04L 63/083 |
| 11,070,532 B1* | 7/2021 | Choi | | H04L 63/083 |
| 11,074,562 B1* | 7/2021 | Phillips | | G06Q 20/4093 |
| 11,093,309 B1* | 8/2021 | Katzer | | G06N 5/047 |
| 11,093,912 B1* | 8/2021 | Fakhraie | | G06F 9/451 |
| 11,093,944 B1* | 8/2021 | Tesser | | H04L 63/0853 |
| 11,106,515 B1* | 8/2021 | Fakhraie | | G06Q 20/4014 |
| 11,153,307 B1* | 10/2021 | Davey | | G06F 3/165 |
| 11,232,518 B1* | 1/2022 | Mcwain | | G06Q 40/03 |
| 11,245,690 B1* | 2/2022 | Yoon | | G06F 21/64 |
| 11,251,975 B1* | 2/2022 | Wahla | | G06Q 20/02 |
| 11,257,057 B1* | 2/2022 | Asmi | | G07G 1/01 |
| 11,288,660 B1* | 3/2022 | Kurani | | G06Q 20/367 |
| 11,316,849 B1* | 4/2022 | Anzaldua | | H04L 63/0428 |
| 11,323,434 B1* | 5/2022 | Vali | | H04L 63/083 |
| 11,354,673 B1* | 6/2022 | Brock | | G06Q 20/4018 |
| 11,381,652 B2* | 7/2022 | Ranjan | | H04L 67/535 |
| 11,386,887 B1* | 7/2022 | Teng | | G10L 17/22 |
| 11,410,161 B1* | 8/2022 | Kurani | | G06Q 20/352 |
| 11,489,842 B1* | 11/2022 | Russell | | H04L 63/20 |
| 11,546,461 B1* | 1/2023 | Jiron | | H04L 63/10 |
| 11,587,058 B1* | 2/2023 | Kurani | | G06Q 20/108 |
| 11,593,789 B1* | 2/2023 | Kurani | | G06Q 20/3223 |
| 11,615,401 B1* | 3/2023 | Kurani | | G06Q 20/3223 705/76 |
| 11,632,366 B1* | 4/2023 | Shemesh | | H04L 67/1004 726/3 |
| 11,710,179 B1* | 7/2023 | Kaditz | | G06Q 30/0641 705/38 |
| 11,740,853 B1* | 8/2023 | Eidam | | G06F 3/0484 715/750 |
| 11,762,972 B1* | 9/2023 | Singhal | | G06F 21/313 455/411 |
| 2001/0031457 A1* | 10/2001 | Pfenninger | | G09B 5/00 434/350 |
| 2001/0032878 A1* | 10/2001 | Tsiounis | | G06Q 20/18 235/379 |
| 2002/0010693 A1* | 1/2002 | Palmer | | A61K 45/06 |
| 2002/0016750 A1* | 2/2002 | Attia | | G06Q 30/02 705/26.7 |
| 2002/0032874 A1* | 3/2002 | Hagen | | H04L 63/18 726/26 |
| 2002/0064149 A1* | 5/2002 | Elliott | | H04L 65/1043 370/352 |
| 2002/0067409 A1* | 6/2002 | Harari | | G02B 21/0004 348/80 |
| 2002/0069129 A1* | 6/2002 | Akutsu | | G06Q 30/06 705/26.35 |
| 2002/0091646 A1* | 7/2002 | Lake | | G06Q 20/12 705/67 |
| 2002/0112177 A1* | 8/2002 | Voltmer | | G07C 9/37 726/26 |
| 2002/0149567 A1* | 10/2002 | Griffin | | G06F 1/1698 345/169 |
| 2003/0033146 A1* | 2/2003 | Morin | | G10L 15/065 704/E15.04 |
| 2003/0046589 A1* | 3/2003 | Gregg | | H04L 63/10 726/5 |
| 2003/0051138 A1* | 3/2003 | Maeda | | H04M 15/48 713/168 |
| 2003/0105648 A1* | 6/2003 | Schurenberg | | G06Q 10/10 705/2 |
| 2003/0105725 A1* | 6/2003 | Hoffman | | G06Q 20/40 705/50 |
| 2003/0115142 A1* | 6/2003 | Brickell | | G07C 9/22 705/51 |
| 2003/0126080 A1* | 7/2003 | Ogmen | | G06Q 20/4037 705/40 |
| 2003/0154371 A1* | 8/2003 | Filipi-Martin | | H04L 9/0894 713/153 |
| 2003/0154405 A1* | 8/2003 | Harrison | | H04L 63/123 726/9 |
| 2003/0173408 A1* | 9/2003 | Mosher, Jr. | | A61B 90/90 235/492 |
| 2003/0200184 A1* | 10/2003 | Dominguez | | G06Q 20/425 705/78 |
| 2003/0208406 A1* | 11/2003 | Okamoto | | G06Q 20/04 705/18 |
| 2003/0221125 A1* | 11/2003 | Rolfe | | G06Q 20/02 379/114.14 |
| 2003/0235092 A1* | 12/2003 | Micheloni | | G11C 29/808 365/200 |
| 2003/0236991 A1* | 12/2003 | Letsinger | | G06F 21/31 726/19 |
| 2004/0030935 A1* | 2/2004 | Kai | | G06F 21/43 726/5 |
| 2004/0039930 A1* | 2/2004 | Ohmori | | G06Q 20/341 713/193 |

(56) References Cited

U.S. PATENT DOCUMENTS

| | | | | |
|---|---|---|---|---|
| 2004/0044739 A1* | 3/2004 | Ziegler | G07F 7/0826 | 709/213 |
| 2004/0066278 A1* | 4/2004 | Hughes | G06Q 20/341 | 340/572.1 |
| 2004/0088551 A1* | 5/2004 | Dor | H04L 63/0853 | 713/182 |
| 2004/0093419 A1* | 5/2004 | Weihl | H04L 63/06 | 709/214 |
| 2004/0117662 A1* | 6/2004 | Ong | G06F 21/41 | 726/5 |
| 2004/0128249 A1* | 7/2004 | Hoffman | H04L 63/04 | 705/44 |
| 2004/0153655 A1* | 8/2004 | Rolfe | G06F 21/32 | 713/185 |
| 2004/0236964 A1* | 11/2004 | Haverinen | H04W 12/068 | 713/168 |
| 2004/0243517 A1* | 12/2004 | Hansen | G06Q 20/382 | 705/64 |
| 2004/0257196 A1* | 12/2004 | Kotzin | G06F 21/31 | 340/5.74 |
| 2005/0035200 A1* | 2/2005 | Hendrick | G06K 7/0008 | 235/441 |
| 2005/0038741 A1* | 2/2005 | Bonalle | G06Q 20/102 | 705/13 |
| 2005/0048951 A1* | 3/2005 | Saito | G06F 21/35 | 455/411 |
| 2005/0077348 A1* | 4/2005 | Hendrick | G06K 7/0021 | 235/382 |
| 2005/0077349 A1* | 4/2005 | Bonalle | G07C 9/28 | 235/380 |
| 2005/0097049 A1 | 5/2005 | Writer et al. | | |
| 2005/0125686 A1* | 6/2005 | Brandt | H04L 63/1466 | 726/22 |
| 2005/0133589 A1* | 6/2005 | Chou | H04L 63/0428 | 235/380 |
| 2005/0154877 A1* | 7/2005 | Trench | G06Q 20/3829 | 713/156 |
| 2005/0162575 A1* | 7/2005 | Harvie | A61F 9/022 | 349/16 |
| 2005/0182956 A1* | 8/2005 | Ginter | H04L 63/08 | 375/E7.009 |
| 2005/0194438 A1* | 9/2005 | Ziegler | G07F 7/1008 | 235/382 |
| 2005/0195975 A1* | 9/2005 | Kawakita | H04L 9/3236 | 380/30 |
| 2005/0198534 A1* | 9/2005 | Matta | H04W 12/06 | 726/5 |
| 2005/0209974 A1* | 9/2005 | Okunseinde | H04L 63/0428 | 705/64 |
| 2005/0226318 A1* | 10/2005 | Shepherd | G11B 27/28 | 348/700 |
| 2005/0240528 A1* | 10/2005 | Hendrick | G06Q 20/40145 | 705/44 |
| 2005/0268107 A1* | 12/2005 | Harris | H04L 63/0853 | 713/182 |
| 2006/0005024 A1* | 1/2006 | Law | H04L 63/083 | 713/168 |
| 2006/0005124 A1* | 1/2006 | Speicher | G06Q 10/06 | 715/205 |
| 2006/0006226 A1* | 1/2006 | Fitzgerald | H04W 12/06 | 235/380 |
| 2006/0031096 A1* | 2/2006 | Buttner | G06Q 10/10 | 705/2 |
| 2006/0054682 A1* | 3/2006 | de la Huerga | G16H 20/10 | 235/375 |
| 2006/0074798 A1* | 4/2006 | Din | G06Q 20/02 | 705/39 |
| 2006/0109844 A1* | 5/2006 | Bomhoff | H04L 61/00 | 370/389 |
| 2006/0121895 A1* | 6/2006 | Zou | H04W 12/06 | 455/433 |
| 2006/0136739 A1* | 6/2006 | Brock | H04L 63/0838 | 713/184 |
| 2006/0149962 A1* | 7/2006 | Fountain | H04L 9/0897 | 713/151 |
| 2006/0206709 A1* | 9/2006 | Labrou | G06Q 20/18 | 713/167 |
| 2006/0208066 A1* | 9/2006 | Finn | H04H 60/74 | 235/441 |
| 2006/0242693 A1* | 10/2006 | Kussmaul | G06F 21/32 | 726/9 |
| 2006/0265648 A1* | 11/2006 | Rainisto | G06F 3/0237 | 715/256 |
| 2006/0265668 A1* | 11/2006 | Rainisto | G06F 3/0236 | 715/816 |
| 2006/0282662 A1* | 12/2006 | Whitcomb | H04L 63/0407 | 713/156 |
| 2006/0288405 A1* | 12/2006 | Albisu | G06Q 20/388 | 726/8 |
| 2007/0011724 A1* | 1/2007 | Gonzalez | G06F 21/34 | 713/184 |
| 2007/0033150 A1 | 2/2007 | Nwosu | | |
| 2007/0038867 A1* | 2/2007 | Verbauwhede | H04L 9/3231 | 713/186 |
| 2007/0040017 A1* | 2/2007 | Kozlay | H04L 63/0861 | 235/441 |
| 2007/0042755 A1* | 2/2007 | Singhal | H04M 3/387 | 455/411 |
| 2007/0050456 A1* | 3/2007 | Vuong | G06Q 10/107 | 709/206 |
| 2007/0055439 A1* | 3/2007 | Denker | G06Q 30/02 | 701/532 |
| 2007/0094512 A1* | 4/2007 | Nomiya | H04L 63/0853 | 713/186 |
| 2007/0118745 A1* | 5/2007 | Buer | G06F 21/34 | 713/168 |
| 2007/0130504 A1* | 6/2007 | Betancourt | G06F 40/226 | 715/236 |
| 2007/0178883 A1* | 8/2007 | Nandagopal | G06Q 20/385 | 455/411 |
| 2007/0186099 A1* | 8/2007 | Beck | H04L 63/06 | 713/159 |
| 2007/0214492 A1* | 9/2007 | Gopi | H04W 4/02 | 726/16 |
| 2007/0214493 A1* | 9/2007 | Davis | H04L 63/10 | 726/2 |
| 2007/0220275 A1* | 9/2007 | Heitzeberg | H04W 12/06 | 713/186 |
| 2007/0226495 A1* | 9/2007 | Kim | H04L 63/0853 | 713/168 |
| 2007/0242824 A1* | 10/2007 | Vishik | H04N 21/454 | 380/200 |
| 2007/0250920 A1* | 10/2007 | Lindsay | G06F 21/31 | 726/7 |
| 2007/0257101 A1* | 11/2007 | Alderucci | A63F 13/212 | 235/382 |
| 2007/0277032 A1* | 11/2007 | Relyea | H04L 63/0853 | 713/159 |
| 2007/0284433 A1* | 12/2007 | Domenica | G06Q 20/40 | 235/379 |
| 2007/0294749 A1* | 12/2007 | Nice | H04L 63/0838 | 726/5 |
| 2007/0300057 A1* | 12/2007 | Corcoran | H04L 9/3234 | 713/154 |
| 2008/0005578 A1* | 1/2008 | Shafir | G07C 9/37 | 713/186 |
| 2008/0015013 A1* | 1/2008 | Gelman | G07F 17/3241 | 463/25 |
| 2008/0046520 A1* | 2/2008 | Jager | G06Q 10/107 | 709/206 |
| 2008/0046723 A1* | 2/2008 | Weber | G07C 9/33 | 713/159 |
| 2008/0046984 A1* | 2/2008 | Bohmer | G06F 21/31 | 726/5 |
| 2008/0070503 A1* | 3/2008 | Bang | H04W 12/06 | 726/2 |

(56) References Cited

U.S. PATENT DOCUMENTS

| | | | |
|---|---|---|---|
| 2008/0085691 A1* | 4/2008 | Harvey | H04B 7/18508 455/187.1 |
| 2008/0098464 A1* | 4/2008 | Mizrah | G06F 21/36 726/5 |
| 2008/0120707 A1* | 5/2008 | Ramia | H04L 63/0861 726/5 |
| 2008/0141353 A1* | 6/2008 | Brown | G10L 13/00 704/260 |
| 2008/0144787 A1* | 6/2008 | Gantman | H04M 1/68 379/93.03 |
| 2008/0185429 A1 | 8/2008 | Saville | |
| 2008/0212771 A1* | 9/2008 | Hauser | G07F 7/1008 726/6 |
| 2008/0300020 A1* | 12/2008 | Nishizawa | H04W 8/20 455/558 |
| 2008/0301460 A1* | 12/2008 | Miller | H04L 63/0815 713/183 |
| 2008/0314977 A1* | 12/2008 | Domenica | G06Q 20/4014 235/380 |
| 2009/0025071 A1* | 1/2009 | Mumm | H04L 63/0861 704/E15.001 |
| 2009/0037285 A1* | 2/2009 | Murphy | G06Q 20/327 705/16 |
| 2009/0037340 A1* | 2/2009 | Hitchen | H04L 9/3297 705/76 |
| 2009/0045253 A1* | 2/2009 | Han | G06Q 20/4014 235/380 |
| 2009/0055924 A1* | 2/2009 | Trotter | H04L 63/0853 726/20 |
| 2009/0064296 A1* | 3/2009 | Aikawa | H04W 12/06 726/6 |
| 2009/0065571 A1* | 3/2009 | Jain | H04M 17/103 235/487 |
| 2009/0069049 A1* | 3/2009 | Jain | G06Q 20/326 455/558 |
| 2009/0069050 A1* | 3/2009 | Jain | H04L 63/083 379/433.05 |
| 2009/0069052 A1* | 3/2009 | Jain | G06K 7/10237 455/558 |
| 2009/0070272 A1* | 3/2009 | Jain | G06K 7/10237 705/35 |
| 2009/0070691 A1* | 3/2009 | Jain | H04L 63/083 715/762 |
| 2009/0073186 A1* | 3/2009 | Caniglia | G06T 11/60 345/619 |
| 2009/0076962 A1* | 3/2009 | Hitchen | G06F 21/6209 705/50 |
| 2009/0088217 A1* | 4/2009 | Chung | H04M 1/0245 455/566 |
| 2009/0100265 A1* | 4/2009 | Tadokoro | G07C 9/257 713/172 |
| 2009/0104888 A1* | 4/2009 | Cox | G06Q 20/20 455/410 |
| 2009/0118997 A1* | 5/2009 | Truitt | G08G 5/0043 701/120 |
| 2009/0126002 A1* | 5/2009 | Vail | H04L 63/08 726/12 |
| 2009/0132417 A1* | 5/2009 | Scipioni | G06Q 20/385 705/44 |
| 2009/0144513 A1* | 6/2009 | Pierce | G06F 16/2379 711/159 |
| 2009/0150989 A1* | 6/2009 | Hoey | G06F 21/33 726/10 |
| 2009/0190802 A1* | 7/2009 | Adams | G07C 9/257 382/115 |
| 2009/0200371 A1* | 8/2009 | Kean | H04L 9/3228 235/492 |
| 2009/0205036 A1* | 8/2009 | Slaton | H04L 63/08 726/26 |
| 2009/0207004 A1* | 8/2009 | Ziska | G07C 5/008 340/426.1 |
| 2009/0235339 A1* | 9/2009 | Mennes | H04L 9/3273 726/5 |
| 2009/0249475 A1* | 10/2009 | Ohaka | G06F 21/43 726/16 |
| 2009/0287921 A1* | 11/2009 | Zhu | G06Q 10/02 713/155 |
| 2009/0300744 A1* | 12/2009 | Guo | G06F 21/34 726/7 |
| 2009/0305670 A1* | 12/2009 | DeBoer | G06Q 20/40 455/411 |
| 2009/0320118 A1* | 12/2009 | Muller | G06F 21/34 726/9 |
| 2009/0328165 A1* | 12/2009 | Cook | H04L 63/0838 726/6 |
| 2010/0005386 A1* | 1/2010 | Verma | G06F 40/289 715/237 |
| 2010/0017334 A1* | 1/2010 | Itoi | G06Q 20/02 705/26.1 |
| 2010/0030743 A1* | 2/2010 | Lim | G06Q 10/10 707/769 |
| 2010/0034385 A1* | 2/2010 | Gantman | H04L 9/065 708/250 |
| 2010/0042583 A1* | 2/2010 | Gervais | G06Q 40/08 707/E17.014 |
| 2010/0042846 A1* | 2/2010 | Trotter | H04L 63/104 235/375 |
| 2010/0091995 A1* | 4/2010 | Chen | H04L 9/0869 380/278 |
| 2010/0125510 A1* | 5/2010 | Smith | G06Q 20/425 705/17 |
| 2010/0174914 A1* | 7/2010 | Shafir | G07C 9/37 713/186 |
| 2010/0218249 A1* | 8/2010 | Wilson | H04W 12/068 726/19 |
| 2010/0223461 A1* | 9/2010 | Drader | G09C 5/00 713/168 |
| 2010/0241571 A1* | 9/2010 | McDonald | G06Q 20/12 705/26.1 |
| 2010/0257359 A1* | 10/2010 | Currie | H04L 63/1466 713/168 |
| 2010/0258625 A1* | 10/2010 | Stanfield | G06Q 20/341 235/380 |
| 2010/0293382 A1* | 11/2010 | Hammad | H04L 9/3234 713/172 |
| 2010/0312539 A1* | 12/2010 | Yamagajo | G06F 30/23 703/14 |
| 2010/0318801 A1* | 12/2010 | Roberge | H04L 63/0853 713/172 |
| 2010/0319064 A1* | 12/2010 | Warrier | G06K 7/1404 726/9 |
| 2011/0047606 A1* | 2/2011 | Blomquist | H04L 63/0815 726/7 |
| 2011/0053560 A1* | 3/2011 | Jain | G06Q 20/3223 455/410 |
| 2011/0113477 A1* | 5/2011 | Miyabayashi | H04L 63/0492 726/7 |
| 2011/0117966 A1* | 5/2011 | Coppinger | G06Q 20/105 455/558 |
| 2011/0119155 A1* | 5/2011 | Hammad | G06Q 20/42 235/382 |
| 2011/0154459 A1* | 6/2011 | Kuang | G06F 21/41 726/6 |
| 2011/0177852 A1* | 7/2011 | Jain | G06Q 20/3574 455/575.8 |
| 2011/0179478 A1* | 7/2011 | Flick | H04L 9/0822 726/9 |
| 2011/0201121 A1* | 8/2011 | Kaartinen | B01L 3/0293 422/68.1 |
| 2011/0202991 A1* | 8/2011 | Paquin | H04L 9/3213 726/5 |
| 2011/0221568 A1* | 9/2011 | Giobbi | H04W 12/06 340/5.82 |
| 2011/0237223 A1* | 9/2011 | Coppinger | H04L 63/0853 455/411 |
| 2011/0237224 A1* | 9/2011 | Coppinger | G06Q 20/3278 455/411 |

(56) References Cited

U.S. PATENT DOCUMENTS

| | | | |
|---|---|---|---|
| 2011/0237296 A1* | 9/2011 | Coppinger | H04L 63/0853 455/558 |
| 2011/0238579 A1* | 9/2011 | Coppinger | G06Q 20/40 705/67 |
| 2011/0238580 A1* | 9/2011 | Coppinger | H04L 67/306 705/65 |
| 2011/0242286 A1* | 10/2011 | Pace | H04N 13/133 348/47 |
| 2011/0244920 A1* | 10/2011 | Coppinger | H04L 67/306 455/558 |
| 2011/0246317 A1* | 10/2011 | Coppinger | H04L 67/306 705/17 |
| 2011/0289563 A1* | 11/2011 | Evenden | H04L 63/1466 455/411 |
| 2011/0307939 A1* | 12/2011 | Okashita | H04L 63/0421 726/3 |
| 2011/0313547 A1* | 12/2011 | Hernandez | G05B 19/042 700/89 |
| 2011/0317824 A1* | 12/2011 | Kim | H04L 63/0853 379/142.05 |
| 2012/0018506 A1* | 1/2012 | Hammad | G06Q 20/385 235/375 |
| 2012/0023207 A1* | 1/2012 | Gandhewar | H04L 61/5038 709/221 |
| 2012/0031969 A1* | 2/2012 | Hammad | G06Q 20/341 235/380 |
| 2012/0089514 A1* | 4/2012 | Kraemling | G06Q 20/18 705/42 |
| 2012/0102324 A1* | 4/2012 | McNeely | H04L 63/0853 713/168 |
| 2012/0133605 A1* | 5/2012 | Tanaka | H04B 13/005 345/173 |
| 2012/0136734 A1* | 5/2012 | Jain | G06Q 20/3227 235/487 |
| 2012/0144201 A1* | 6/2012 | Anantha | H04L 9/3247 713/172 |
| 2012/0166338 A1* | 6/2012 | Agnelli | H04W 4/80 705/44 |
| 2012/0179761 A1* | 7/2012 | Fuhrmann | G06F 3/0481 709/206 |
| 2012/0185692 A1* | 7/2012 | Hamlin | H04L 63/0853 713/176 |
| 2012/0191615 A1* | 7/2012 | Schibuk | G06Q 20/401 705/76 |
| 2012/0198005 A1* | 8/2012 | DeLuca | G06Q 10/107 709/206 |
| 2012/0198491 A1* | 8/2012 | O'Connell | G06F 21/316 725/30 |
| 2012/0206365 A1* | 8/2012 | Wangsness | G06F 40/232 345/169 |
| 2012/0210448 A1* | 8/2012 | Vrancken | H04L 63/0853 726/29 |
| 2012/0221998 A1* | 8/2012 | Rowley | G06F 8/34 717/105 |
| 2012/0226582 A1* | 9/2012 | Hammad | G06Q 20/425 705/35 |
| 2012/0239571 A1* | 9/2012 | Boot | B60L 53/65 700/297 |
| 2012/0311684 A1* | 12/2012 | Paulsen | G06Q 20/4014 726/6 |
| 2012/0321084 A1* | 12/2012 | Le Saint | H04L 9/3247 380/277 |
| 2013/0023241 A1* | 1/2013 | Lim | H04L 63/0853 455/411 |
| 2013/0024577 A1* | 1/2013 | Krishnaswamy | G06Q 10/107 709/227 |
| 2013/0031260 A1* | 1/2013 | Jones | H04L 63/18 709/228 |
| 2013/0054457 A1* | 2/2013 | Strickland | B60L 53/65 705/44 |
| 2013/0055356 A1* | 2/2013 | Gafni | G06F 21/40 726/4 |
| 2013/0090059 A1* | 4/2013 | Edwards | H04W 12/06 455/41.1 |
| 2013/0097526 A1* | 4/2013 | Stovicek | G06Q 10/107 715/752 |
| 2013/0110729 A1* | 5/2013 | Mcalear | G06F 21/31 705/76 |
| 2013/0117832 A1* | 5/2013 | Gandhi | H04L 63/0869 726/7 |
| 2013/0124135 A1* | 5/2013 | Chang | G01B 5/012 702/121 |
| 2013/0138570 A1* | 5/2013 | Ross | H04L 63/0861 705/76 |
| 2013/0151629 A1* | 6/2013 | DeLuca | G06Q 10/107 709/206 |
| 2013/0152184 A1* | 6/2013 | Wang | G06F 21/44 726/7 |
| 2013/0166450 A1* | 6/2013 | Pama | H04L 63/18 455/411 |
| 2013/0166913 A1* | 6/2013 | Lenon | H04L 9/3234 713/170 |
| 2013/0200999 A1* | 8/2013 | Spodak | G16H 10/65 340/5.65 |
| 2013/0205380 A1* | 8/2013 | Avni | H04W 12/068 726/7 |
| 2013/0246261 A1* | 9/2013 | Purves | G06Q 20/36 705/41 |
| 2013/0263242 A1* | 10/2013 | Jain | G06F 21/78 726/9 |
| 2013/0275303 A1* | 10/2013 | Fiore | G06Q 20/12 705/44 |
| 2013/0276082 A1* | 10/2013 | Kuang | H04L 63/0869 726/7 |
| 2013/0292479 A1* | 11/2013 | Jain | G06K 7/10237 235/487 |
| 2013/0297933 A1* | 11/2013 | Fiducia | H04L 63/0823 713/156 |
| 2013/0305287 A1* | 11/2013 | Wong | H04N 21/47202 725/40 |
| 2013/0346302 A1* | 12/2013 | Purves | G06Q 20/102 705/40 |
| 2014/0013108 A1* | 1/2014 | Pellikka | H04L 63/0853 713/156 |
| 2014/0013116 A1* | 1/2014 | Smith | H04L 63/0815 713/168 |
| 2014/0020108 A1* | 1/2014 | John | H04L 51/212 726/26 |
| 2014/0032110 A1* | 1/2014 | Simring | G01C 21/34 701/533 |
| 2014/0040147 A1* | 2/2014 | Varadarajan | G06Q 20/4016 713/168 |
| 2014/0041009 A1* | 2/2014 | Kousaka | H04L 63/0853 726/9 |
| 2014/0045586 A1* | 2/2014 | Allen | G07F 17/3241 463/25 |
| 2014/0052995 A1* | 2/2014 | Hu | G06F 21/45 713/184 |
| 2014/0053196 A1* | 2/2014 | Selim | H04N 21/25 725/41 |
| 2014/0062853 A1* | 3/2014 | Chaudhri | G06F 3/013 345/156 |
| 2014/0074713 A1* | 3/2014 | Neuwirth | H04W 12/084 705/44 |
| 2014/0101721 A1* | 4/2014 | Nagase | H04L 63/0853 726/3 |
| 2014/0123224 A1* | 5/2014 | Nosrati | H04W 12/50 726/3 |
| 2014/0129356 A1* | 5/2014 | Jain | G06Q 20/352 705/16 |
| 2014/0136309 A1* | 5/2014 | Goldman | G06Q 30/0226 705/16 |
| 2014/0136353 A1* | 5/2014 | Goldman | G06Q 20/227 705/16 |
| 2014/0149263 A1* | 5/2014 | Denton | G06F 3/04883 715/224 |
| 2014/0157381 A1* | 6/2014 | Disraeli | H04L 63/0853 726/7 |

(56) References Cited

U.S. PATENT DOCUMENTS

| | | | |
|---|---|---|---|
| 2014/0161258 A1* | 6/2014 | Yang | H04W 12/03 380/270 |
| 2014/0164244 A1* | 6/2014 | Wilson | G06Q 20/3263 705/44 |
| 2014/0189808 A1* | 7/2014 | Mahaffey | G06F 21/6245 726/4 |
| 2014/0207479 A1* | 7/2014 | Noland | G06Q 40/08 705/2 |
| 2014/0223531 A1* | 8/2014 | Outwater | A61B 5/18 726/7 |
| 2014/0229387 A1* | 8/2014 | Chow | G06Q 20/3829 705/71 |
| 2014/0245389 A1* | 8/2014 | Oberheide | H04L 63/0815 726/3 |
| 2014/0245396 A1* | 8/2014 | Oberheide | G06F 21/40 726/4 |
| 2014/0257956 A1* | 9/2014 | Durbha | G06Q 30/0225 705/14.23 |
| 2014/0279514 A1* | 9/2014 | Sharp | G06F 21/42 705/44 |
| 2014/0282885 A1* | 9/2014 | Mechaley, Jr. | H04L 9/3226 726/4 |
| 2014/0282964 A1* | 9/2014 | Stubblefield | H04L 63/20 726/7 |
| 2014/0282993 A1* | 9/2014 | Van Till | G07C 9/27 726/9 |
| 2014/0287725 A1* | 9/2014 | Lee | H04W 12/35 455/411 |
| 2014/0317713 A1* | 10/2014 | Gadotti | G06F 21/36 726/7 |
| 2014/0331286 A1* | 11/2014 | Davis | G06F 21/34 726/4 |
| 2014/0351126 A1* | 11/2014 | Priebatsch | G06Q 20/20 705/44 |
| 2015/0019944 A1* | 1/2015 | Kalgi | G06Q 20/3552 715/205 |
| 2015/0026049 A1* | 1/2015 | Theurer | G06Q 20/36 705/41 |
| 2015/0040193 A1* | 2/2015 | Clemons | G06F 21/40 726/4 |
| 2015/0040203 A1* | 2/2015 | Qian | H04L 63/0861 726/7 |
| 2015/0074408 A1* | 3/2015 | Oberheide | H04L 9/083 713/171 |
| 2015/0074774 A1* | 3/2015 | Nema | H04L 63/062 726/5 |
| 2015/0081552 A1* | 3/2015 | Stewart | G06Q 20/3226 705/44 |
| 2015/0089568 A1* | 3/2015 | Sprague | H04L 63/0853 726/1 |
| 2015/0095999 A1* | 4/2015 | Toth | H04L 9/3263 726/6 |
| 2015/0102899 A1* | 4/2015 | Kim | G08C 17/06 340/5.7 |
| 2015/0109428 A1* | 4/2015 | Mechaley, Jr. | G06V 10/95 348/77 |
| 2015/0113621 A1* | 4/2015 | Glickfield | H04L 51/046 726/7 |
| 2015/0120471 A1* | 4/2015 | Cooke | G06Q 20/401 705/16 |
| 2015/0142623 A1* | 5/2015 | Ferguson | G06F 21/88 705/30 |
| 2015/0150108 A1* | 5/2015 | Asai | H04L 63/08 726/8 |
| 2015/0154588 A1* | 6/2015 | Purves | G06Q 20/12 705/14.27 |
| 2015/0161616 A1* | 6/2015 | Brunet | G06F 1/24 707/738 |
| 2015/0172292 A1* | 6/2015 | Kuang | H04L 63/0884 713/155 |
| 2015/0186632 A1* | 7/2015 | Liu | G06F 21/31 726/7 |
| 2015/0200934 A1* | 7/2015 | Naguib | H04L 9/3247 713/168 |
| 2015/0200936 A1* | 7/2015 | Kim | H04L 63/0853 713/171 |
| 2015/0206147 A1* | 7/2015 | Stanfield | G06Q 20/24 705/41 |
| 2015/0207790 A1* | 7/2015 | Lu | G06F 21/44 726/9 |
| 2015/0208238 A1* | 7/2015 | Jiang | H04L 63/0876 713/155 |
| 2015/0215312 A1* | 7/2015 | Cesnik | H04N 21/44008 726/9 |
| 2015/0215455 A1* | 7/2015 | Perotti | H04M 3/493 379/88.01 |
| 2015/0220892 A1 | 8/2015 | Allen | |
| 2015/0220914 A1* | 8/2015 | Purves | G06Q 30/0633 705/41 |
| 2015/0242602 A1* | 8/2015 | Skygebjerg | H04W 12/06 726/7 |
| 2015/0242852 A1* | 8/2015 | Goldstone | G06Q 20/401 705/44 |
| 2015/0254661 A1 | 9/2015 | Lanc | |
| 2015/0257010 A1* | 9/2015 | Salonen | H04W 12/08 455/411 |
| 2015/0269369 A1* | 9/2015 | Hamid | G06F 21/45 726/5 |
| 2015/0271164 A1* | 9/2015 | Hamid | H04L 63/0853 726/7 |
| 2015/0271200 A1* | 9/2015 | Brady | H04L 63/1416 726/4 |
| 2015/0281225 A1* | 10/2015 | Schoen | H04L 63/08 726/9 |
| 2015/0288668 A1* | 10/2015 | Kupper | H04L 67/306 726/4 |
| 2015/0312251 A1* | 10/2015 | Genestier | G06F 21/62 726/7 |
| 2015/0326559 A1* | 11/2015 | Kuang | G06F 21/34 726/5 |
| 2015/0326565 A1* | 11/2015 | Kuang | H04L 63/0869 726/4 |
| 2015/0356316 A1* | 12/2015 | Thompson | G06F 21/00 726/28 |
| 2015/0356560 A1 | 12/2015 | Shastry et al. | |
| 2015/0365283 A1* | 12/2015 | Ronca | G06Q 20/065 705/71 |
| 2015/0379888 A1* | 12/2015 | Hill | G09B 7/06 434/236 |
| 2016/0012430 A1* | 1/2016 | Chandrasekaran | G06Q 20/00 705/44 |
| 2016/0012441 A1* | 1/2016 | Goldberg | G06Q 20/401 705/44 |
| 2016/0019543 A1* | 1/2016 | Taylor, III | G06Q 20/40 726/5 |
| 2016/0019547 A1* | 1/2016 | Gurnani | G06Q 20/3223 705/44 |
| 2016/0021691 A1* | 1/2016 | Lee | H04W 4/70 455/435.1 |
| 2016/0026996 A1* | 1/2016 | Jain | G06Q 20/326 |
| 2016/0036790 A1* | 2/2016 | Shastry | G06Q 20/3821 713/168 |
| 2016/0036803 A1* | 2/2016 | Li | H04L 63/0853 713/168 |
| 2016/0036805 A1* | 2/2016 | Lin | H04L 63/0876 726/5 |
| 2016/0044033 A1* | 2/2016 | Hsiang | H04L 63/18 726/5 |
| 2016/0048705 A1* | 2/2016 | Yang | H04W 12/08 726/34 |
| 2016/0048846 A1* | 2/2016 | Douglas | G06F 16/23 705/318 |
| 2016/0057125 A1* | 2/2016 | Li | H04L 63/0853 713/168 |
| 2016/0080157 A1* | 3/2016 | Lundström | H04L 63/126 713/176 |
| 2016/0080364 A1* | 3/2016 | Karimzadeh | G06F 21/606 726/6 |

(56) References Cited

U.S. PATENT DOCUMENTS

| | | | |
|---|---|---|---|
| 2016/0094525 A1* | 3/2016 | Lin | G06Q 20/3823 |
| | | | 713/171 |
| 2016/0104161 A1 | 4/2016 | Butler | |
| 2016/0112778 A1* | 4/2016 | Wang | H04Q 11/0067 |
| | | | 398/45 |
| 2016/0112870 A1* | 4/2016 | Pathuri | H04W 12/50 |
| | | | 726/4 |
| 2016/0125180 A1* | 5/2016 | Smith | H04L 9/0822 |
| | | | 726/20 |
| 2016/0142398 A1* | 5/2016 | Lin | H04L 63/083 |
| | | | 726/7 |
| 2016/0142439 A1* | 5/2016 | Goutal | H04L 63/1425 |
| | | | 726/22 |
| 2016/0142894 A1* | 5/2016 | Papakonstantinou | G16H 40/67 |
| | | | 455/404.1 |
| 2016/0147990 A1* | 5/2016 | Schneider | G06F 21/44 |
| | | | 726/19 |
| 2016/0149870 A1* | 5/2016 | Chou | G06Q 20/3674 |
| | | | 713/168 |
| 2016/0173483 A1* | 6/2016 | Wong | H04W 12/06 |
| | | | 726/9 |
| 2016/0180136 A1* | 6/2016 | Meier | G06K 7/1473 |
| | | | 235/462.1 |
| 2016/0189127 A1* | 6/2016 | Amarnath | G06K 19/06037 |
| | | | 705/18 |
| 2016/0191514 A1* | 6/2016 | Talmor | H04L 63/10 |
| | | | 726/4 |
| 2016/0191540 A1* | 6/2016 | Fuka | H04W 12/08 |
| | | | 726/4 |
| 2016/0198223 A1* | 7/2016 | Maluk | H04N 21/44218 |
| | | | 709/206 |
| 2016/0205098 A1* | 7/2016 | Han | H04L 63/123 |
| | | | 713/155 |
| 2016/0219034 A1* | 7/2016 | Hintermeister | H04L 9/3226 |
| 2016/0232381 A1* | 8/2016 | Ju | G06F 21/72 |
| 2016/0239657 A1* | 8/2016 | Loughlin-Mchugh | G06F 21/45 |
| 2016/0260098 A1* | 9/2016 | Landrock | G06F 21/56 |
| 2016/0261585 A1* | 9/2016 | Ito | G06F 21/31 |
| 2016/0267486 A1* | 9/2016 | Mitra | G07F 7/0846 |
| 2016/0267493 A1* | 9/2016 | Liu | G06K 19/06037 |
| 2016/0269379 A1* | 9/2016 | Livesay | H04L 63/0861 |
| 2016/0269415 A1* | 9/2016 | Dykeman | H04L 63/102 |
| 2016/0269908 A1* | 9/2016 | Richards | G06Q 30/0248 |
| 2016/0277930 A1* | 9/2016 | Li | H04L 41/28 |
| 2016/0283839 A1* | 9/2016 | Ye | G16H 15/00 |
| 2016/0286396 A1* | 9/2016 | Tuukkanen | H04W 76/10 |
| 2016/0300224 A1* | 10/2016 | Liu | G06K 19/06112 |
| 2016/0307179 A1* | 10/2016 | Zou | H04L 63/0281 |
| 2016/0337334 A1* | 11/2016 | Murr | H04L 63/0853 |
| 2016/0344728 A1* | 11/2016 | Jeon | H04L 63/0838 |
| 2016/0364716 A1* | 12/2016 | Bakshi | G06Q 20/3224 |
| 2016/0371736 A1* | 12/2016 | Turner | H04L 51/10 |
| 2016/0379220 A1* | 12/2016 | Tunnell | H04W 12/068 |
| | | | 705/71 |
| 2017/0006471 A1* | 1/2017 | Kim | H04W 12/06 |
| 2017/0019396 A1* | 1/2017 | Bettenburg | G06F 21/36 |
| 2017/0019400 A1* | 1/2017 | Drolshagen | H04L 63/0861 |
| 2017/0024728 A1* | 1/2017 | Bull | G06Q 20/3572 |
| 2017/0024729 A1* | 1/2017 | Huxham | G06Q 20/4018 |
| 2017/0039566 A1 | 2/2017 | Schipperheijn | |
| 2017/0041296 A1* | 2/2017 | Ford | G06F 21/64 |
| 2017/0053286 A1* | 2/2017 | Bhagat | G06Q 20/40 |
| 2017/0054561 A1* | 2/2017 | Schleiff | H04L 9/3231 |
| 2017/0063848 A1* | 3/2017 | Collinge | H04L 63/0853 |
| 2017/0070484 A1* | 3/2017 | Kruse | H04L 63/0442 |
| 2017/0075894 A1* | 3/2017 | Poornachandran | G06Q 50/01 |
| 2017/0078270 A1* | 3/2017 | Tang | H04L 63/0815 |
| 2017/0078322 A1* | 3/2017 | Seiver | H04W 84/005 |
| 2017/0085561 A1* | 3/2017 | Han | H04L 63/0861 |
| 2017/0085568 A1* | 3/2017 | Rolfe | H04L 63/06 |
| 2017/0086041 A1* | 3/2017 | Bao | G06F 21/6245 |
| 2017/0086069 A1* | 3/2017 | Liu | H04L 9/3213 |
| 2017/0086070 A1* | 3/2017 | Henderson | H04L 63/102 |
| 2017/0109752 A1* | 4/2017 | Hubbard | H04L 63/10 |
| 2017/0132200 A1* | 5/2017 | Noland | G06F 40/186 |
| 2017/0142589 A1* | 5/2017 | Park | H04L 63/0861 |
| 2017/0148009 A1* | 5/2017 | Perez Lafuente | H04L 63/20 |
| 2017/0169427 A1 | 6/2017 | Sikljovan et al. | |
| 2017/0171216 A1* | 6/2017 | Chhabra | H04L 63/08 |
| 2017/0177808 A1* | 6/2017 | Irwin | G06Q 40/123 |
| 2017/0177809 A1* | 6/2017 | Bull | G16H 50/30 |
| 2017/0178093 A1* | 6/2017 | Bull | G06Q 20/227 |
| 2017/0178135 A1* | 6/2017 | Bull | G06Q 20/40 |
| 2017/0178245 A1* | 6/2017 | Rodkey | G06Q 30/0202 |
| 2017/0186012 A1 | 6/2017 | McNeal | |
| 2017/0187701 A1* | 6/2017 | Bonnell | H04L 63/107 |
| 2017/0199713 A1* | 7/2017 | Clark | G06F 16/9038 |
| 2017/0228405 A1* | 8/2017 | Ward | G06F 16/2474 |
| 2017/0228738 A1 | 8/2017 | Beenau et al. | |
| 2017/0243219 A1 | 8/2017 | Wong et al. | |
| 2017/0244730 A1* | 8/2017 | Sancheti | H04L 63/205 |
| 2017/0250816 A1* | 8/2017 | Popa | G06F 21/62 |
| 2017/0250938 A1* | 8/2017 | Dahl | H04L 51/02 |
| 2017/0272418 A1* | 9/2017 | Kim | H04L 63/08 |
| 2017/0279798 A1* | 9/2017 | Reynolds | H04L 63/0853 |
| 2017/0286711 A1* | 10/2017 | Negrea | H04L 63/10 |
| 2017/0286768 A1* | 10/2017 | Livesay | H04W 12/02 |
| 2017/0289127 A1* | 10/2017 | Hendrick | H04W 12/065 |
| 2017/0289168 A1* | 10/2017 | Bar | H04L 63/1408 |
| 2017/0289181 A1* | 10/2017 | Wang | G06Q 20/00 |
| 2017/0295155 A1* | 10/2017 | Wong | H04L 67/306 |
| 2017/0295175 A1* | 10/2017 | Guo | H04L 9/40 |
| 2017/0308906 A1* | 10/2017 | McCauley | G06Q 20/407 |
| 2017/0316493 A1* | 11/2017 | Numata | G06Q 30/0631 |
| 2017/0318001 A1* | 11/2017 | Eggers | G06F 21/64 |
| 2017/0323354 A1* | 11/2017 | Martell | H04M 15/866 |
| 2017/0324750 A1* | 11/2017 | Khan | H04W 12/068 |
| 2017/0330165 A1* | 11/2017 | Banerjee | H04W 12/06 |
| 2017/0346802 A1* | 11/2017 | Gruskin | G06F 8/62 |
| 2017/0346815 A1* | 11/2017 | Andrews | H04L 9/3231 |
| 2017/0346851 A1* | 11/2017 | Drake | H04L 9/0838 |
| 2017/0359339 A1* | 12/2017 | Hevizi | H04M 1/72406 |
| 2017/0359342 A1* | 12/2017 | Magyar | H04L 63/0853 |
| 2017/0359723 A1* | 12/2017 | Pal | H04L 63/083 |
| 2017/0366530 A1 | 12/2017 | Dominguez et al. | |
| 2017/0372056 A1* | 12/2017 | Narasimhan | G06F 21/32 |
| 2017/0372310 A1* | 12/2017 | Narasimhan | H04L 63/0853 |
| 2018/0025442 A1* | 1/2018 | Isaacson | H04L 51/48 |
| | | | 705/26.62 |
| 2018/0026968 A1* | 1/2018 | Canavor | H04L 63/0823 |
| | | | 726/6 |
| 2018/0028905 A1* | 2/2018 | Shoemaker, Jr. | G07F 17/3255 |
| 2018/0032712 A1* | 2/2018 | Oh | G06Q 20/227 |
| 2018/0032750 A1* | 2/2018 | Hammel | G06F 21/6218 |
| 2018/0032759 A1* | 2/2018 | Radocchia | G06F 21/6254 |
| 2018/0034822 A1* | 2/2018 | Mistry | H04W 12/37 |
| 2018/0041479 A1* | 2/2018 | Wang | H04L 63/0838 |
| 2018/0053160 A1* | 2/2018 | Schwartz | G06Q 20/389 |
| 2018/0060867 A1* | 3/2018 | Hagan | G06Q 20/34 |
| 2018/0068105 A1* | 3/2018 | Shapiro | G06F 21/602 |
| 2018/0068290 A1* | 3/2018 | Xia | H04L 63/0846 |
| 2018/0069704 A1* | 3/2018 | Dray, Jr. | H04L 9/3247 |
| 2018/0075452 A1 | 3/2018 | Weller et al. | |
| 2018/0077133 A1* | 3/2018 | Matute | H04L 9/3215 |
| 2018/0082304 A1* | 3/2018 | Summerlin | G06Q 20/3229 |
| 2018/0091498 A1* | 3/2018 | Kekicheff | H04L 9/0869 |
| 2018/0103019 A1* | 4/2018 | Chen | H04L 63/0492 |
| 2018/0103341 A1* | 4/2018 | Moiyallah, Jr. | G06F 3/04842 |
| 2018/0109378 A1* | 4/2018 | Fu | H04L 9/0897 |
| 2018/0121683 A1* | 5/2018 | Goldberg | H04L 63/0853 |
| 2018/0122256 A1* | 5/2018 | Smith | G09B 7/00 |
| 2018/0123804 A1* | 5/2018 | Smith | H04W 12/069 |
| 2018/0124047 A1* | 5/2018 | Fisher | H04L 63/0861 |
| 2018/0143958 A1* | 5/2018 | Kakkad | G06F 40/174 |
| 2018/0145827 A1* | 5/2018 | Pitel | G06F 21/14 |
| 2018/0146363 A1* | 5/2018 | Liu | H04L 63/0853 |
| 2018/0150836 A1* | 5/2018 | Kumar | G06Q 20/38215 |
| 2018/0158057 A1* | 6/2018 | Kirch | G06Q 20/405 |
| 2018/0158061 A1* | 6/2018 | Edelstein | H04W 12/06 |
| 2018/0159839 A1* | 6/2018 | Citron | H04W 12/06 |
| 2018/0167386 A1* | 6/2018 | Bhatt | G06Q 20/40145 |

(56) References Cited

U.S. PATENT DOCUMENTS

| | | | |
|---|---|---|---|
| 2018/0173871 A1* | 6/2018 | Toth | H04W 12/126 |
| 2018/0176212 A1* | 6/2018 | Nair | H04L 63/0838 |
| 2018/0181958 A1* | 6/2018 | Locke | G06Q 20/401 |
| 2018/0189788 A1* | 7/2018 | Lacoss-Arnold | G06Q 20/3223 |
| 2018/0191695 A1* | 7/2018 | Lindemann | H04L 63/0853 |
| 2018/0198621 A1* | 7/2018 | Senyuk | G06F 21/35 |
| 2018/0198781 A1* | 7/2018 | Bhogal | H04W 12/06 |
| 2018/0205557 A1* | 7/2018 | Sun | H04L 63/123 |
| 2018/0205725 A1* | 7/2018 | Cronkright | H04L 63/0838 |
| 2018/0211258 A1* | 7/2018 | Buis | G06Q 20/12 |
| 2018/0212957 A1* | 7/2018 | Lee | G06Q 20/4014 |
| 2018/0219917 A1* | 8/2018 | Chiang | H04L 63/1433 |
| 2018/0234420 A1* | 8/2018 | Mattes | G06Q 20/40145 |
| 2018/0240107 A1* | 8/2018 | Andrade | G06Q 20/065 |
| 2018/0255460 A1 | 9/2018 | Hammad et al. | |
| 2018/0288060 A1* | 10/2018 | Jackson | H04L 63/107 |
| 2018/0308086 A1* | 10/2018 | Shan | G06Q 20/204 |
| 2018/0308095 A1* | 10/2018 | Hammad | G06Q 20/409 |
| 2018/0316665 A1* | 11/2018 | Caldera | H04L 63/104 |
| 2018/0322501 A1* | 11/2018 | Eisen | G06Q 20/34 |
| 2018/0322571 A1* | 11/2018 | Vea | G06Q 30/02 |
| 2018/0331837 A1* | 11/2018 | Uhr | H04L 12/08 |
| 2018/0332033 A1* | 11/2018 | Lakhani | G06F 21/35 |
| 2018/0332065 A1* | 11/2018 | Gupta | H04L 63/101 |
| 2018/0349880 A1* | 12/2018 | Steele | G06Q 20/3255 |
| 2018/0349881 A1* | 12/2018 | Steele | G06Q 20/3223 |
| 2018/0351949 A1* | 12/2018 | Scott | H04L 9/30 |
| 2018/0359227 A1* | 12/2018 | Trantham | G06F 21/6218 |
| 2018/0359811 A1* | 12/2018 | Verzun | H04W 12/03 |
| 2018/0373849 A1* | 12/2018 | Gidley | G06F 21/6245 |
| 2018/0375864 A1* | 12/2018 | Kano | H04L 63/0853 |
| 2019/0005491 A1* | 1/2019 | Grassadonia | G06Q 20/4014 |
| 2019/0007397 A1* | 1/2019 | Goldberg | H04W 12/08 |
| 2019/0014108 A1* | 1/2019 | Rothschild | H04L 9/3231 |
| 2019/0020476 A1* | 1/2019 | Kats | H04L 9/32 |
| 2019/0026234 A1* | 1/2019 | Harnik | H04L 63/0428 |
| 2019/0026577 A1* | 1/2019 | Hall | G06V 30/413 |
| 2019/0026579 A1* | 1/2019 | Hall | G06V 30/2253 |
| 2019/0034929 A1* | 1/2019 | Tang | G07F 7/0886 |
| 2019/0036906 A1* | 1/2019 | Biyani | H04L 63/20 |
| 2019/0036913 A1* | 1/2019 | Tzur-David | H04L 63/18 |
| 2019/0036914 A1* | 1/2019 | Tzur-David | H04L 63/20 |
| 2019/0042719 A1* | 2/2019 | Miu | H04L 63/0861 |
| 2019/0052629 A1* | 2/2019 | Manepalli | H04L 63/0853 |
| 2019/0068587 A1* | 2/2019 | Zhao | H04L 63/0853 |
| 2019/0068608 A1* | 2/2019 | Boland | H04L 63/123 |
| 2019/0075094 A1* | 3/2019 | Clarke | G06Q 20/401 |
| 2019/0075101 A1* | 3/2019 | Wang | G06F 21/31 |
| 2019/0080326 A1* | 3/2019 | Trivedi | G06Q 20/4012 |
| 2019/0089538 A1* | 3/2019 | Park | H04L 9/3226 |
| 2019/0102778 A1* | 4/2019 | Lebovic | G06Q 20/401 |
| 2019/0104121 A1* | 4/2019 | Khandani | H04L 9/085 |
| 2019/0116051 A1* | 4/2019 | Rome | H04L 63/083 |
| 2019/0122213 A1* | 4/2019 | Chen | G06Q 20/12 |
| 2019/0124066 A1* | 4/2019 | Peddada | H04L 63/0838 |
| 2019/0130386 A1* | 5/2019 | Bhat | G06Q 20/367 |
| 2019/0132304 A1* | 5/2019 | Overby | H04L 63/0853 |
| 2019/0139024 A1* | 5/2019 | Bakshi | H04W 12/72 |
| 2019/0140844 A1* | 5/2019 | Brown | H04L 63/0428 |
| 2019/0149540 A1* | 5/2019 | Shimazu | H04W 12/06 726/4 |
| 2019/0158496 A1* | 5/2019 | Hallock | H04L 63/0861 |
| 2019/0158655 A1* | 5/2019 | DeLuca | H04M 3/2281 |
| 2019/0163931 A1* | 5/2019 | Wolverton | G06F 21/6245 |
| 2019/0166128 A1* | 5/2019 | Kurian | H04L 63/0853 |
| 2019/0182044 A1* | 6/2019 | Mullen | H04L 9/3247 |
| 2019/0190907 A1* | 6/2019 | Panus | G06Q 30/018 |
| 2019/0197815 A1* | 6/2019 | Kamal | H04L 63/0861 |
| 2019/0199755 A1* | 6/2019 | Larionov | H04L 67/10 |
| 2019/0231160 A1* | 8/2019 | Lu | A47L 11/4011 |
| 2019/0236559 A1* | 8/2019 | Padmanabhan | G06Q 20/02 |
| 2019/0236562 A1* | 8/2019 | Padmanabhan | H04L 63/00 |
| 2019/0236598 A1* | 8/2019 | Padmanabhan | G06Q 20/389 |
| 2019/0236606 A1* | 8/2019 | Padmanabhan | H04L 9/3239 |
| 2019/0236866 A1* | 8/2019 | Leonard | G07C 9/253 |
| 2019/0238316 A1* | 8/2019 | Padmanabhan | G06N 20/00 |
| 2019/0238525 A1* | 8/2019 | Padmanabhan | H04L 63/0428 |
| 2019/0253413 A1* | 8/2019 | Wang | H04L 63/0853 |
| 2019/0253434 A1* | 8/2019 | Biyani | H04L 63/126 |
| 2019/0270118 A1* | 9/2019 | Araujo-Simon | G06F 15/16 |
| 2019/0281048 A1* | 9/2019 | Dong | H04L 63/0853 |
| 2019/0289008 A1* | 9/2019 | Serban | H04L 63/0853 |
| 2019/0295054 A1* | 9/2019 | Purves | G06Q 20/227 |
| 2019/0303915 A1* | 10/2019 | Hammad | G06Q 20/12 |
| 2019/0303929 A1* | 10/2019 | Brown | H04L 63/0853 |
| 2019/0304336 A1* | 10/2019 | DeLand | G06F 40/205 |
| 2019/0311145 A1* | 10/2019 | Baskaran | G06F 21/6209 |
| 2019/0318122 A1* | 10/2019 | Hockey | H04L 63/0853 |
| 2019/0318361 A1* | 10/2019 | Hurst | G06Q 20/383 |
| 2019/0327245 A1* | 10/2019 | Holton | H04L 63/0853 |
| 2019/0332691 A1* | 10/2019 | Beadles | G06Q 20/3829 |
| 2019/0333048 A1* | 10/2019 | DiCross | G06Q 50/01 |
| 2019/0333054 A1* | 10/2019 | Cona | H04L 9/3297 |
| 2019/0340610 A1 | 11/2019 | Song et al. | |
| 2019/0347669 A1* | 11/2019 | Satpute | H04L 63/08 |
| 2019/0354720 A1* | 11/2019 | Tucker | G06F 40/295 |
| 2019/0357050 A1* | 11/2019 | Kennedy-Foster | H04L 63/0853 |
| 2019/0370804 A1* | 12/2019 | Perry | G06Q 20/12 |
| 2019/0385396 A1* | 12/2019 | Jothipandian | G06Q 20/3574 |
| 2019/0386826 A1* | 12/2019 | Kato | H04L 63/0861 |
| 2019/0386984 A1* | 12/2019 | Thakkar | H04L 63/18 |
| 2019/0394189 A1* | 12/2019 | Thirumalai | H04L 63/0838 |
| 2020/0013250 A1* | 1/2020 | Jakubek | G07C 9/23 |
| 2020/0051675 A1* | 2/2020 | Nelson | G16H 15/00 |
| 2020/0055243 A1* | 2/2020 | Zhou | B33Y 30/00 |
| 2020/0058002 A1* | 2/2020 | Patanaik | G06F 16/951 |
| 2020/0058021 A1* | 2/2020 | Mittal | G06Q 20/3829 |
| 2020/0068389 A1* | 2/2020 | Rothkopf | H04L 63/0492 |
| 2020/0068399 A1* | 2/2020 | Brown | H04L 9/3236 |
| 2020/0076813 A1* | 3/2020 | Felice-Steele | H04L 63/0861 |
| 2020/0082396 A1* | 3/2020 | Chow | G06Q 20/1085 |
| 2020/0082401 A1* | 3/2020 | Arora | H04L 63/0876 |
| 2020/0089700 A1* | 3/2020 | Ericson | G06F 40/30 |
| 2020/0089760 A1* | 3/2020 | Ericson | G06F 3/04812 |
| 2020/0090168 A1* | 3/2020 | Mossler | G06Q 20/409 |
| 2020/0092282 A1* | 3/2020 | Childress | G06F 21/44 |
| 2020/0092283 A1* | 3/2020 | Parkinson | H04L 63/0807 |
| 2020/0092284 A1* | 3/2020 | Zhu | H04L 9/3234 |
| 2020/0097971 A1* | 3/2020 | Church | G06Q 20/36 |
| 2020/0106608 A1* | 4/2020 | Lo | G06F 21/57 |
| 2020/0111091 A1* | 4/2020 | Ellingson | G06Q 20/3829 |
| 2020/0122931 A1* | 4/2020 | Chen | B25J 15/08 |
| 2020/0127858 A1* | 4/2020 | Stöhr | H04L 63/0853 |
| 2020/0134600 A1* | 4/2020 | Koeppel | G06Q 20/3224 |
| 2020/0137038 A1* | 4/2020 | Endler | H04L 63/20 |
| 2020/0137096 A1* | 4/2020 | Endler | H04L 63/083 |
| 2020/0137109 A1* | 4/2020 | Endler | H04L 63/083 |
| 2020/0145220 A1* | 5/2020 | Chang | H04L 63/0861 |
| 2020/0167793 A1* | 5/2020 | Muralidharan | G06Q 20/326 |
| 2020/0167862 A1* | 5/2020 | Manepalli | H04L 63/083 |
| 2020/0169568 A1* | 5/2020 | Kurian | H04W 12/06 |
| 2020/0195636 A1* | 6/2020 | Landrock | H04L 63/0853 |
| 2020/0201443 A1* | 6/2020 | Huang | G06N 20/20 |
| 2020/0213119 A1* | 7/2020 | Schat | G06Q 20/363 |
| 2020/0213293 A1* | 7/2020 | Zhou | G06F 21/31 |
| 2020/0213298 A1* | 7/2020 | Ericson | H04W 12/47 |
| 2020/0213310 A1* | 7/2020 | Ju | H04L 63/0876 |
| 2020/0220862 A1* | 7/2020 | Chan | H04W 60/00 |
| 2020/0234283 A1* | 7/2020 | Greiche | H04L 9/0825 |
| 2020/0244656 A1* | 7/2020 | Manepalli | H04W 12/08 |
| 2020/0245142 A1* | 7/2020 | Manepalli | H04L 63/102 |
| 2020/0250413 A1* | 8/2020 | Lu | G06V 30/228 |
| 2020/0250651 A1* | 8/2020 | Lee | G06Q 20/3223 |
| 2020/0250666 A1* | 8/2020 | Carri | G06Q 20/4014 |
| 2020/0259827 A1* | 8/2020 | Shaffer | G06F 8/61 |
| 2020/0259828 A1* | 8/2020 | Shaffer | H04L 63/0853 |
| 2020/0259829 A1* | 8/2020 | Shaffer | H04L 63/0853 |
| 2020/0259830 A1* | 8/2020 | Shaffer | H04L 63/0823 |
| 2020/0267283 A1* | 8/2020 | Tong | G06V 30/412 |
| 2020/0279255 A1* | 9/2020 | Douglas | H04L 63/0876 |
| 2020/0296082 A1* | 9/2020 | Killoran, Jr. | G06Q 20/4014 |
| 2020/0296585 A1* | 9/2020 | Bolotin | H04W 12/06 |

(56) References Cited

U.S. PATENT DOCUMENTS

| | | | | |
|---|---|---|---|---|
| 2020/0304310 A1* | 9/2020 | Rule | H04W 4/80 |
| 2020/0313881 A1* | 10/2020 | Feng | H04L 63/0861 |
| 2020/0320292 A1* | 10/2020 | Chawda | G06Q 20/389 |
| 2020/0327513 A1 | 10/2020 | Salama et al. | |
| 2020/0328880 A1* | 10/2020 | Bolotin | H04L 9/3297 |
| 2020/0336597 A1* | 10/2020 | Haltom | H04M 3/42059 |
| 2020/0342088 A1* | 10/2020 | Jorgensen | G06F 21/40 |
| 2020/0342394 A1* | 10/2020 | Moore | G06Q 20/385 |
| 2020/0342445 A1* | 10/2020 | Yoo | H04L 63/068 |
| 2020/0344058 A1* | 10/2020 | Wang | H04L 63/0807 |
| 2020/0344224 A1* | 10/2020 | Hochman | H04L 63/0815 |
| 2020/0366665 A1* | 11/2020 | Vasudevan | H04L 63/0815 |
| 2020/0366704 A1* | 11/2020 | Vasudevan | H04L 63/20 |
| 2020/0374286 A1* | 11/2020 | Agarwal | G06V 40/20 |
| 2020/0374287 A1* | 11/2020 | Bowie | H04W 12/06 |
| 2020/0380426 A1* | 12/2020 | Schlank | G06Q 50/265 |
| 2020/0389450 A1* | 12/2020 | Levitt | G06Q 20/385 |
| 2020/0402052 A1* | 12/2020 | Sloane | H04L 63/105 |
| 2020/0403992 A1* | 12/2020 | Huffman | G06F 21/6263 |
| 2021/0004454 A1* | 1/2021 | Chester | H04L 63/0807 |
| 2021/0004803 A1* | 1/2021 | Rule | G06K 19/0723 |
| 2021/0014229 A1* | 1/2021 | Beveridge | H04L 63/1441 |
| 2021/0027295 A1* | 1/2021 | Raquepaw | G07F 19/206 |
| 2021/0029107 A1* | 1/2021 | Parkinson | G06Q 30/0609 |
| 2021/0036859 A1* | 2/2021 | Sukhomlinov | H04L 9/3273 |
| 2021/0042764 A1* | 2/2021 | Rungta | H04L 63/0853 |
| 2021/0051159 A1* | 2/2021 | Kesanupalli | H04L 63/0861 |
| 2021/0058392 A1* | 2/2021 | Leddy, III | G06Q 20/388 |
| 2021/0064780 A1* | 3/2021 | Riedel | G06Q 30/0185 |
| 2021/0067201 A1* | 3/2021 | Wang | G06Q 20/227 |
| 2021/0073365 A1* | 3/2021 | Boussard | H04L 63/0853 |
| 2021/0081937 A1* | 3/2021 | Yaqub | G06Q 20/40145 |
| 2021/0084024 A1* | 3/2021 | Sadayoshi | G06F 9/451 |
| 2021/0090068 A1* | 3/2021 | Merino Gonzalez | G06Q 20/325 |
| 2021/0105267 A1* | 4/2021 | Brown | G06F 21/6218 |
| 2021/0112098 A1* | 4/2021 | Lillie | H04L 63/18 |
| 2021/0117524 A1* | 4/2021 | McKell-Redwood | H04L 9/3231 |
| 2021/0120003 A1* | 4/2021 | Rothschild | H04L 9/3226 |
| 2021/0126904 A1* | 4/2021 | Kakugwa | H04L 63/0407 |
| 2021/0133736 A1* | 5/2021 | Kavanagh | G06Q 20/3825 |
| 2021/0141888 A1* | 5/2021 | Hires | H04L 9/3231 |
| 2021/0146883 A1* | 5/2021 | Ha | B60W 40/08 |
| 2021/0168455 A1* | 6/2021 | Campbell | H04W 12/03 |
| 2021/0176234 A1* | 6/2021 | Silverstein | H04L 63/083 |
| 2021/0192039 A1* | 6/2021 | Pihur | G06F 21/31 |
| 2021/0192508 A1* | 6/2021 | Edwards | G06Q 20/3829 |
| 2021/0194703 A1* | 6/2021 | Queralt | H04L 63/0815 |
| 2021/0208952 A1* | 7/2021 | Jain | G06F 9/5044 |
| 2021/0216612 A1* | 7/2021 | Wojcik | H04L 9/3247 |
| 2021/0233078 A1* | 7/2021 | Vittimberga | H04L 63/083 |
| 2021/0250765 A1* | 8/2021 | Vargas | H04W 12/71 |
| 2021/0256500 A1* | 8/2021 | Kuchenski | B60W 60/00256 |
| 2021/0271766 A1* | 9/2021 | Yoho | H04L 63/102 |
| 2021/0281559 A1* | 9/2021 | Valecha | H04L 63/0853 |
| 2021/0297411 A1* | 9/2021 | Keselman | H04L 63/0807 |
| 2021/0303630 A1* | 9/2021 | Atkinson | G16H 10/60 |
| 2021/0314282 A1* | 10/2021 | Sharma | H04L 65/65 |
| 2021/0320922 A1* | 10/2021 | Furhmann | G06Q 20/385 |
| 2021/0326432 A1* | 10/2021 | Kaidi | H04L 9/3226 |
| 2021/0336962 A1* | 10/2021 | Mulampaka | H04L 63/0853 |
| 2021/0357897 A1* | 11/2021 | Phillips | G06Q 20/18 |
| 2021/0374709 A1* | 12/2021 | Suresh | G06F 16/2282 |
| 2021/0383387 A1* | 12/2021 | Ratica | G06Q 40/02 |
| 2021/0385183 A1* | 12/2021 | Henao Mota | H04L 63/0838 |
| 2021/0385216 A1* | 12/2021 | Khalil | H04L 9/3239 |
| 2021/0398141 A1* | 12/2021 | Benkreira | H04W 12/72 |
| 2021/0398145 A1* | 12/2021 | Hare | G06Q 20/3226 |
| 2021/0406861 A1* | 12/2021 | Edmiston | H04W 12/79 |
| 2022/0003040 A1* | 1/2022 | Capitaine | E06B 9/521 |
| 2022/0006812 A1* | 1/2022 | Rodriguez Bravo | H04L 63/105 |
| 2022/0009039 A1* | 1/2022 | Korematsu | B23K 26/53 |
| 2022/0021706 A1* | 1/2022 | Jubilee | H04L 63/20 |
| 2022/0027887 A1* | 1/2022 | Palanisamy | G06Q 20/4014 |
| 2022/0050890 A1* | 2/2022 | Karantzis | G06F 21/35 |
| 2022/0052997 A1* | 2/2022 | Kim | H04L 9/3231 |
| 2022/0060471 A1* | 2/2022 | Wilson | H04W 12/65 |
| 2022/0076258 A1* | 3/2022 | Tax | G06Q 20/18 |
| 2022/0086131 A1* | 3/2022 | Kinai | G06N 20/00 |
| 2022/0092604 A1* | 3/2022 | Kwatra | G06Q 20/4014 |
| 2022/0092928 A1* | 3/2022 | Piazza | G07F 17/3216 |
| 2022/0108314 A1* | 4/2022 | Mehta | G06Q 20/405 |
| 2022/0109986 A1* | 4/2022 | Jogand-Coulomb | H04L 63/0853 |
| 2022/0129872 A1* | 4/2022 | Guggarigoudar | G06Q 20/3223 |
| 2022/0129900 A1* | 4/2022 | Naujok | H04W 12/66 |
| 2022/0174043 A1* | 6/2022 | Mihatsch | H04W 12/37 |
| 2022/0198394 A1* | 6/2022 | Chandra | H04L 63/0807 |
| 2022/0311617 A1* | 9/2022 | Lundberg | G06Q 20/425 |
| 2022/0343319 A1* | 10/2022 | Murao | H04L 9/50 |
| 2022/0405357 A1* | 12/2022 | King | G06Q 50/265 |
| 2023/0009385 A1* | 1/2023 | Naccache | H04L 63/067 |
| 2023/0020193 A1* | 1/2023 | Williams | H04L 9/0877 |
| 2023/0032549 A1* | 2/2023 | Ciarniello | H04L 63/0838 |
| 2023/0035507 A1* | 2/2023 | Mohammed | H04L 63/0807 |
| 2023/0043031 A1* | 2/2023 | Watanabe | H04L 9/3228 |

OTHER PUBLICATIONS

Carretero et al "Federated Identity Architecture of the European eID System," IEEE Access, pp. 75302-75326, (Year: 2018).*

Sood et al "An Empirical Study of HTTP-based Financial Botnets," IEEE Transactions on Dependable and Secure Computing, vol. 13, No. 2, Mar./Apr. 2016, pp. 236-251 (Year: 2016).*

Krawiecka et al "SafeKeeper: Protecting Web Passwords using Trusted Execution Environments," Track: Security and Privacy on the Web, Apr. 23-27, 2018, Lyon, France, pp. 349-358 (Year: 2018).*

Hsu et al "An Online Fraud-Resistant Technology for Credit Card E-Transactions," IEEE, pp. 1-4 (Year: 2007).*

Guo et al "Aggregated Privacy-Preserving Identity Verification for Composite Web Services," 2011 IEEE International Conference on Web Services, IEEE Computer Society, pp. 692-693 (Year: 2011).*

Copeland et al Independently Verifiable Identity Scheme (IVIS), IEEE, pp. 196-198 (Year: 2017).*

* cited by examiner

IDENTITY VERIFICATION THROUGH MULTISYSTEM COOPERATION

TECHNICAL FIELD

The present disclosure relates generally to multisystem data transferring and, more specifically, to identity verification through multisystem cooperation.

BACKGROUND

The internet has enabled individuals to interact with organizations and other entities without ever stepping foot inside the physical buildings operated by the entities. For example, an individual may provide information to an entity simply by entering the information into a form displayed on a webpage belonging to the entity or otherwise transmitting the information electronically to the entity.

SUMMARY

This disclosure contemplates an identity verification system that may be used to help verify the identity of a user who is providing electronic information to an entity system. In particular, the disclosed system may be used to verify a user's identity when the user is attempting to engage in an electronic transaction with an entity system by using an internet-connected device to provide account information to the entity system. When the user enters an account number into a field displayed on a webpage of the entity, a system associated with the institution at which the user's account is held generates a validation number for the transaction. The institution system then transmits this validation number to a second device, which the user/account holder had previously registered with the system. After receiving the validation number on his/her second device, the user enters the validation number into the webpage displayed on his/her first device and transmits it to the entity system as part of the user's transaction request. The entity system then provides the validation number that it received from the user back to the institution system for authentication. If the validation number received by the institution system matches the validation number that the institution system originally transmitted to the second device, the institution system determines that the user who is attempting to conduct the transaction with the entity system is in fact the account holder (as opposed to an individual who has obtained the account holder's information and is attempting to impersonate the account holder), and instructs the entity system to approve the requested transaction. On the other hand, if the received validation number does not match the validation number originally transmitted by the institution system to the second device, the institution system instructs the entity system to decline the requested transaction. An embodiment of the identity verification system is described below.

According to one embodiment, a system includes a first subsystem associated with an institution and a second subsystem associated with an entity. The first subsystem includes a memory and a hardware processor communicatively coupled to the memory. The second subsystem includes a hardware processor. The hardware processor of the first subsystem receives, from a first user device, a request for a validation number. The first user device transmitted the request for the validation number in response to a determination that an account number had been entered into a first field of a webpage displayed on the first user device. The webpage is associated with the entity. The account number corresponds to an account held at the institution. In response to receiving the request for the validation number, the processor of the first subsystem randomly generates the validation number. The processor of the first subsystem also stores a copy of the validation number in the memory. The processor of the first subsystem additionally transmits the validation number to a second user device associated with the account. The hardware processor of the second subsystem receives, from the first user device, a request for a transaction. The request for the transaction includes the validation number. The first user device transmitted the request for the transaction in response to the second user device receiving the validation number and the validation number being entered into a second field of the webpage displayed on the first user device. The processor of the second subsystem also transmits the validation number received in the request for the transaction to the first subsystem. In response to receiving the validation number, the hardware processor of the first subsystem determines that the validation number received from the second subsystem matches the copy of the validation number stored in the memory. In response to determining that the validation number received from the second subsystem matches the copy of the validation number stored in the memory, the processor of the first subsystem transmits a message to the second subsystem authorizing the transaction.

Certain embodiments provide one or more technical advantages. As an example, an embodiment includes a mobile device application that, in response to the mobile device receiving a validation number, is configured to automatically display a pop-up notification of the validation number on the mobile device display. In this manner, the embodiment enables a user of the mobile device to efficiently access the validation number, and conserves processing resources that would otherwise be expended by the user using his/her mobile device to navigate to the mobile application and accessing the validation number within the mobile application. As another example, in certain embodiments, a user device is configured to determine when a user has entered an account number into a field displayed on a webpage and, in response, automatically replace the account verification fields traditionally displayed on the webpage with a field for input of a validation number. In this manner, certain embodiments conserve the processing and networking resources that would otherwise be expended by (1) the device transmitting the account number and the traditional account verification data to a merchant system, (2) the merchant system determining that the account number belongs to an institution for which the user should transmit a validation number to the merchant system, and (3) the merchant system transmitting a request to the user's device to display a field for input of the validation number. The system described in the present disclosure may particularly be integrated into a practical application of an identity verification system for use by an institution that conducts electronic transactions on behalf of its account holders, who initiate the transactions by providing account details to entities through webpages belonging to the entities.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
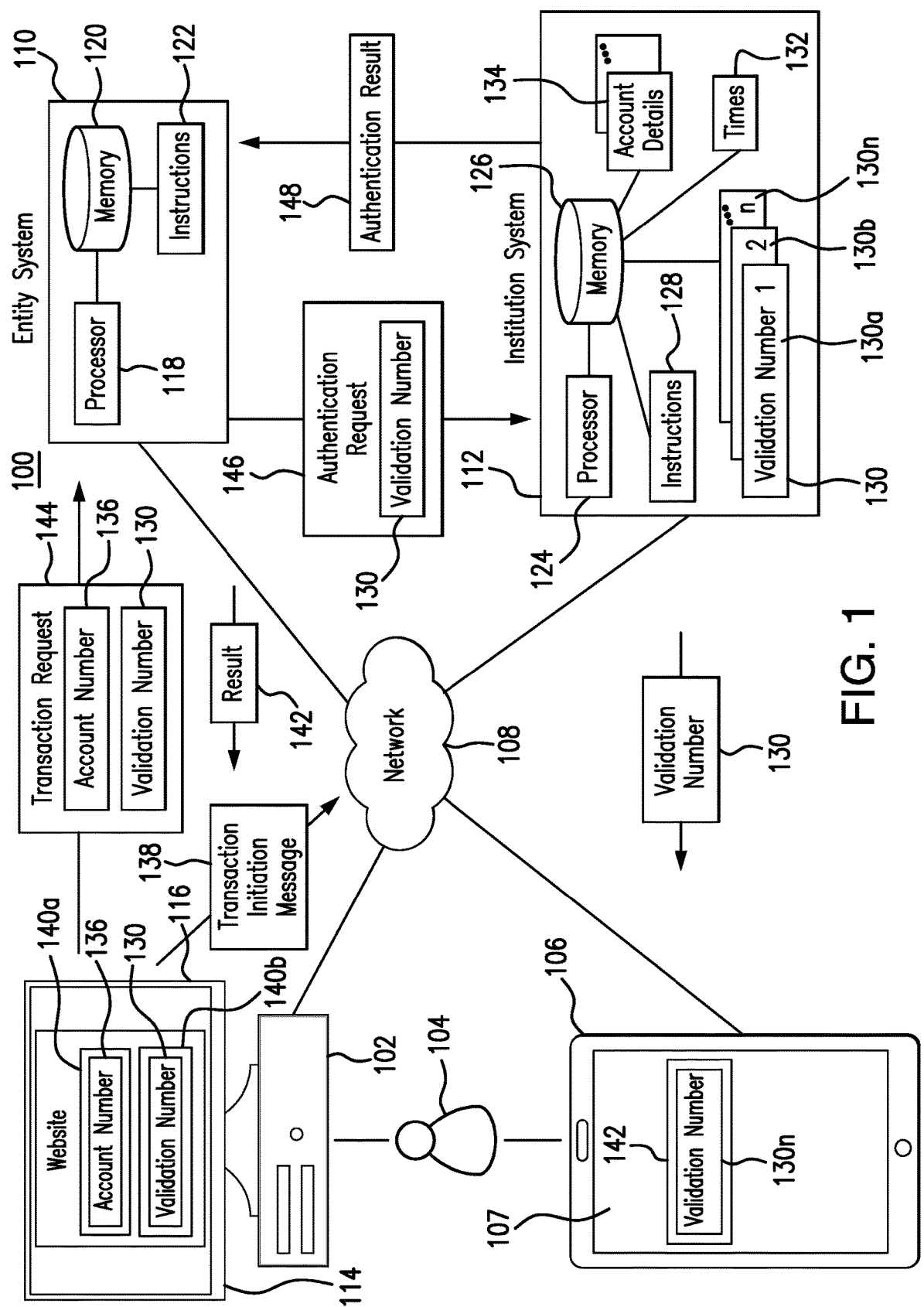
FIG. 1 illustrates an example identity verification system.
Figure 2A:
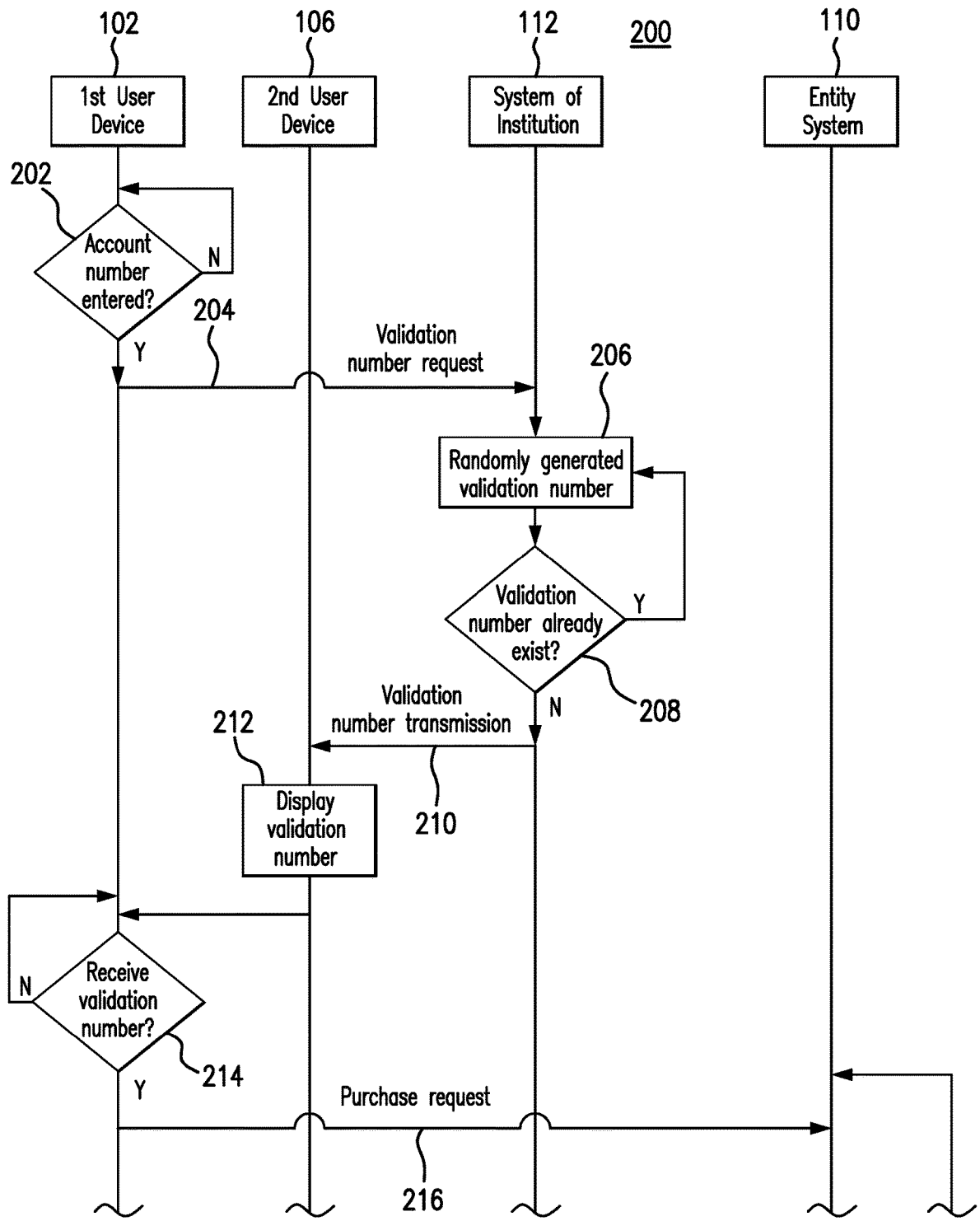
FIGS. 2A and 2B present a flowchart illustrating a method by which the first user device, second user device, institution system, and entity system of the identity verification system of FIG. 1 act cooperatively to verify the identity of a user who is attempting to engage in a transaction with the entity system.
Figure 2B:
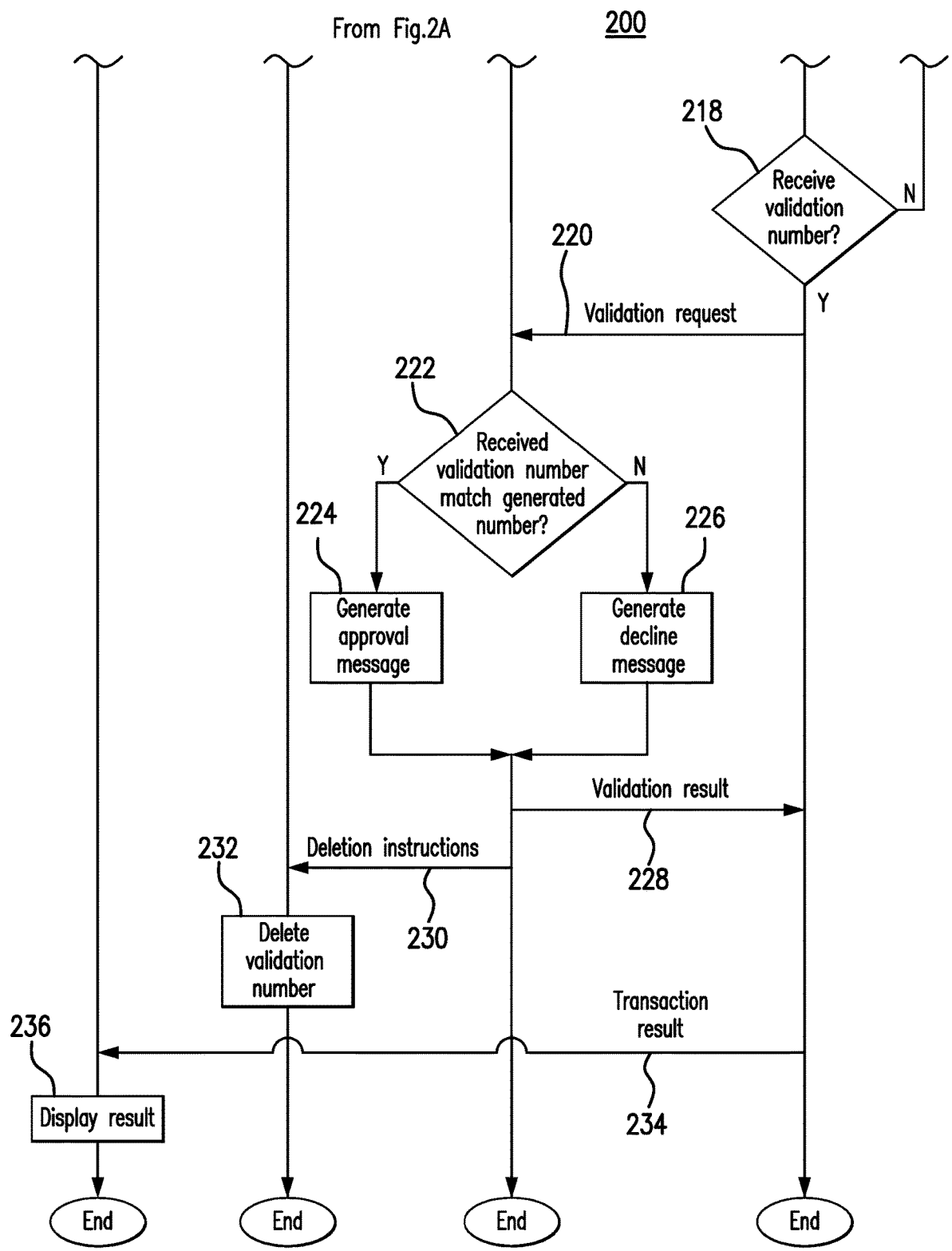

Embodiments of the present disclosure and its advantages may be understood by referring to FIGS. 1 through 2B of the drawings, like numerals being used for like and corresponding parts of the various drawings.

I. System Overview

FIG. 1 illustrates an example identity verification system 100 that includes first device 102, user 104, second device 106, network 108, entity system 110, and institution system 112. Entity system 110 is associated with an entity with which user 104 may conduct a transaction. Institution system 112 is associated with an institution at which user 104 holds an account that user 104 may use to conduct the transaction. Generally, when user 104 attempts to engage in a transaction with entity system 110 using first device 102, institution system 112, entity system 110, first device 102, and second device 106 act cooperatively to verify the identify of user 104, with the aid of a validation number 130, generated by institution system 112 for the transaction. While described throughout this disclosure as being a number, validation number 130 may be any suitable sequence of characters. For example, in certain embodiments, validation number 130 may be an alphanumeric number, or any other suitable sequence of characters. Details of the manner by which validation number 130 is generated and subsequently used by first device 102, second device 106, entity system 110, and institution system 112 to confirm the identity of user 104 are presented below, and in the discussion of FIGS. 2A and 2B.

First device 102 and second device 106 are used by user 104 to communicate with components of system 100 over network 108. As illustrated in FIG. 1, in certain embodiments first device 102 and second device 106 are separate devices. In some embodiments, first device 102 and second device 106 are the same device. For example, first device 102 and second device 106 may both correspond to a smart phone operated by user 104.

First device 102 includes display 114. First device 102 is configured to display a webpage 116 belonging to entity system 110 on display 114. For example, user 104 may use first device 102 to access a web browser installed on first device 102 and use the web browser to navigate to webpage 116. Webpage 116 is an interactive webpage through which user 104 may initiate a transaction with entity system 110. For example, user 104 may use webpage 116 to purchase one or more goods from the entity associated with entity system 110. As illustrated in FIG. 1, webpage 116 may display one or more fields 140a/b. For example, webpage 116 may display a first field 140a for input of an account number 136, and a second field 140b for input of a validation number 130. While illustrated in FIG. 1 as including two fields 140a/b, webpage 116 may display any number of fields 140a/b. Furthermore, in certain embodiments, webpage 116 may be configured to adjust the number of displayed fields 140a/b in response to receiving input from user 104. For example, in certain embodiments, when webpage 116 first loads, webpage 116 may be configured to display a set of fields 140a/b that includes a field for input of a credit/bank card number, a field for input of an expiry date of the credit/bank card, and a field for input of a card verification value (CVV) number. Then, in response to user 104 entering a credit/bank card number that is associated with institution system 112, device 102 may be configured to replace the field for input of the expiry date of the credit/bank card and the field for input of the CVV number with a field 140b for input of a validation number 130.

In response to user 104 entering an account number 136 that is associated with institution system 112 into first field 140a, first device 102 is configured to transmit transaction initiation message 138 to institution system 112. As described in further detail below, and in the discussion of FIGS. 2A and 2B, transaction initiation message 138 is used by first device 102 to request that institution system 112 generate a validation number 130 for the transaction that user 104 is initiating. First device 102 may be configured to determine that user 104 has entered an account number 136 that is associated with institution system 112 into field 140a in any suitable manner. For example, in certain embodiments, device 102 is configured to make this determination based on the first four numbers of account number 136. In response to user 104 entering a validation number 130 into second field 140b, first device 102 is configured to transmit transaction request 144 to entity system 110. Transaction request 144 includes account number 136 and validation number 130. As described in further detail below, and in the discussion of FIGS. 2A and 2B, entity system 110 uses the information transmitted in transaction request 144 to verify user 104's identity and to process the requested transaction.

First device 102 includes any appropriate device for displaying webpage 116 and for communicating with components of system 100 over network 108. For example, first device 102 may be a mobile phone, a computer, a laptop, a tablet, an IoT device, and/or an automated assistant, among others. In addition to including display 114, first device 102 may include any other appropriate user interface, such as a microphone, keypad, or other appropriate terminal equipment usable by user 104. In some embodiments, an application executed by a processor of first device 102 may perform the functions described herein.

Second device 106 is configured to receive validation number 130 from institution system 112 and present validation number 130 to user 104. Second device 106 may be configured to receive and present validation number 130 to user 104 in any suitable manner. As an example, in certain embodiments, an application installed on second device 106 is configured to receive validation number 130 from institution system 112 and to present validation number 130 to user 104. For example, the application may be configured to automatically generate a pop-up notification 142 that includes validation number 130 on the display 107 of second device 106. In some embodiments, second device 106 may automatically turn on display 107 in order to present pop-up notification 142 to user 104. In this manner, second device 106 may display validation number 130 to user 104 even though user 104 is not actively operating second device 106. In certain embodiments, second device 106 may be configured to display pop-up notification 142 to user 104 for a set amount of time, after which validation number 130 may no longer be available to user 104. In some embodiments, user 106 may be able to view validation number 130 even after pop-up notification 142 has disappeared from display 107. For example, in such embodiments, user 104 may view validation number 130 by navigating to the application that generated pop-up notification 142 and viewing validation number 130 within the application. As another example of the manner by which second device 106 may present validation number 130 to user 104, in certain embodiments, second device 106 may receive validation number 130 from institution system 112 in an SMS message or any other electronic message (e.g., email), and present the electronic message to user 104 on display 107. As a further example, in certain embodiments in which second device 106 is the same device as first device 102, in response to receiving validation number 130 from institution system 112, second device 106 may be configured to automatically populate second field 140b, displayed on webpage 116, with validation number 130.

Second device 106 includes any appropriate mobile device for displaying validation number 130 to user 104, and for communicating with components of system 100 over network 108. For example, second device 102 may be a mobile phone, a laptop, a tablet, an IoT device, and/or an automated assistant, among others. In addition to including display 107, second device 102 may include any other appropriate user interface, such as a microphone, keypad, or other appropriate terminal equipment usable by user 104. In some embodiments, an application executed by a processor of second device 106 may perform the functions described herein.

Network 108 facilitates communication between and amongst the various components of system 100. This disclosure contemplates network 108 being any suitable network operable to facilitate communication between such components. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Entity system 110 is associated with a given entity with which user 104 is attempting to engage in a transaction. For example, entity system 110 may belong to a merchant with an online store, and/or any other entity with which user 104 may attempt to engage in a transaction. As illustrated in FIG. 1, entity system 110 includes a processor 118 and a memory 120. This disclosure contemplates processor 118 and memory 120 being configured to perform any of the functions of entity system 110 described herein. For example, processor 118 may execute instructions 122 stored in memory 120 to perform any of the functions described herein. Generally, entity system 110 is configured to: (1) receive a transaction request 144 from first device 102 that includes a validation number 130; (2) provide the received validation number 130 to institution system 112 for authentication; (3) receive an authentication result 148 back from institution system 112, indicating whether or not the validation number 130 received from first device 102 matches the validation number 130 stored by institution system 112; and (4) approve or decline transaction request 144 based on authentication result 148. These functions of entity system 110 are described in further detail below, in the discussion of FIGS. 2A and 2B.

Processor 118 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 120 and controls the operation of entity system 110. Processor 118 may be 8-bit, 16-bit, 32-bit, 64-bit or of any other suitable architecture. Processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 118 may include other hardware and software that operates to control and process information. Processor 118 executes software, such as instructions 122, stored on memory to perform any of the functions described herein. Processor 118 controls the operation and administration of entity system 110 by processing information received from first device 102, second device 106, network 108, and/or institution system 112. Processor 118 may be a programmable logic device, a microcontroller, a microprocessor, any suitable processing device, or any suitable combination of the preceding. Processor 118 is not limited to a single processing device and may encompass multiple processing devices. In certain embodiments in which processor 118 encompasses multiple processing devices, such devices may be located at geographically separate locations from one another and connected to one another by a network (e.g., network 108).

Memory 120 may store, either permanently or temporarily, data, operational software, or other information for processor 118, such as instructions 122. Memory 120 may include any one or a combination of volatile or non-volatile local or remote devices suitable for storing information. For example, memory 120 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 120, a disk, a CD, or a flash drive. In particular embodiments, the software may include an application, such as instructions 122, executable by processor 118 to perform one or more of the functions described herein.

Institution system 112 is associated with a given institution at which user 104 holds an account that the user may use to complete a transaction with entity system 110. For example, institution system 112 may belong to a bank, a credit card company, and/or any other financial institution with which user 104 may hold an account. As illustrated in FIG. 1, institution system 112 includes a processor 124 and a memory 126. This disclosure contemplates processor 124 and memory 126 being configured to perform any of the functions of institution system 112 described herein. For example, processor 124 may execute instructions 128 stored in memory 126 to perform any of the functions described herein. Generally, institution system 112 is configured to: (1) receive transaction initiation message 138 from first device 102, indicating that user 104 is attempting to initiate a transaction with entity system 110; (2) in response to receiving transaction initiation message 138, randomly generate a validation number 130 for the transaction; (3) store a copy of validation number 130 in memory 126; (4) transmit validation number 130 to second device 106; (5) receive an authentication request 146 from entity system 110, which includes a validation number 130 received by entity system 110 from first device 102; (6) compare the received validation number 130 with the copy of the validation number 130 stored in memory 126; and (7) transmit a message 148 to entity system 110 instructing entity system 110 to approve or decline transaction request 144, based on the results of the comparison. These functions of institution system 112 are described in further detail below, in the discussion of FIGS. 2A and 2B.

Processor 124 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 126 and controls the operation of institution system 112. Processor 124 may be 8-bit, 16-bit, 32-bit, 64-bit or of any other suitable architecture. Processor 124 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 124 may include other hardware and software that operates to control and process information. Processor 124 executes software, such as instructions 128, stored on memory to perform any of the functions described herein. Processor 124 controls the operation and administration of institution system 112 by processing information received from first device 102, second device 106, network 108, and/or entity system 110. Processor 124 may be a programmable logic device, a microcontroller, a microprocessor, any suitable processing device, or any suitable combination of the preceding. Processor 124 is not limited to a single processing device and may encompass multiple processing devices. In certain embodiments in which processor 124 encompasses multiple processing devices, such devices may be located at geographically separate locations from one another and connected to one another by a network (e.g., network 108).

Memory 126 may store, either permanently or temporarily, data, operational software, or other information for processor 124, such as instructions 128. Memory 126 may include any one or a combination of volatile or non-volatile local or remote devices suitable for storing information. For example, memory 126 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 126, a disk, a CD, or a flash drive. In particular embodiments, the software may include an application, such as instructions 128, executable by processor 124 to perform one or more of the functions described herein.

Memory 126 also stores copies of the validation numbers 130*a* through 130*n* that have been generated by institution system 112. In certain embodiments, memory 126 stores copies of the validation numbers that it has generated and that are outstanding. For example, memory 126 stores copies of the validation numbers that institution system 112 has not yet received back from entity system 110 in authentication requests 146. In some embodiments, memory 126 stores a full set of historical validation numbers 130*a* through 130*n* (e.g., copies of both the outstanding validation numbers 130 and those validation numbers 130 that institution system 112 has received back from entity system 110 in authentication requests 146). Institution system 112 may use this full set of historical validation numbers 130*a* through 130*n* to help ensure that any new validation numbers 130 that it generates have not previously been used for identity verification purposes, as described in further detail below, in the discussion of FIGS. 2A and 2B.

In certain embodiments, memory 126 also stores a set of times 132 and a set of account details 134. Each time of the set of times 132 is associated with a validation number 130, and corresponds to the time at which the validation number was generated by institution system 112. In certain embodiments, validation numbers 130 may expire after a certain amount of time. In such embodiments, institution system 112 uses set of times 132 to determine whether or not a validation number 130 received in an authentication request 146 has expired, as described in further detail below, in the discussion of FIGS. 2A and 2B. In certain embodiments, for each user 104 who holds an account with the institution associated with institution system 112, account details 134 stores information about the user and/or his/her account. For example, for a given user 104, account details 134 may store the account number 136 assigned to the user's account as well as an identification of second device 106, to which institution system 112 should send validation numbers 130, and/or any other information that institution system 112 may use to transmit validation numbers 130 to second device 106. For example, account details 134 may include a cell phone number assigned to second device 106, an email address belonging to user 104, and/or any other suitable identification information that may be used to transmit validation number 130 to second device 106.

Modifications, additions, or omissions may be made to the systems described herein without departing from the scope of the invention. For example, system 100 may include any number of users 104, first devices 102, second devices 106, entity system 110, and institution systems 112. The components may be integrated or separated. Moreover, the operations may be performed by more, fewer, or other components. Additionally, the operations may be performed using any suitable logic comprising software, hardware, and/or other logic.

FIGS. 2A and 2B present a flowchart (described in conjunction with elements of FIG. 1) illustrating an example method 200 by which first device 102, second device 106, institution system 112, and entity system 110 act cooperatively to verify the identify of a user 104 who is attempted to engage in a transaction with entity system 110.

In step 202 first device 102 determines whether or not user 104 has entered an account number 136 into a field 140*a* of a webpage 116 associated with entity system 110. If, in step 202 first device 102 determines that user 104 has entered an account number 136 into field 140*a*, in step 204 first device 102 transmits a message 138 to institutions system 112 requesting that institution system 112 generate a validation number 130. In step 206 institution system 112 randomly generates a validation number 130. Institution system 112 may randomly generate validation number 130 in any suitable manner. As an example, in certain embodiments in which validation number 130 corresponds to a sequence of numerical digits, institution system 112 may generate validation number 130 using a random number generator stored in memory 126. For example, institution system 112 may use the random number generator to generate a validation number 130 that is 5 digits in length, 10 digits in length, or any other suitable length. In some embodiments, institution system 112 may use the random number generator to randomly generate a length for the validation number as well as to randomly generate the digits that make up the validation number. In certain embodiments in which validation number 130 is an alphanumeric number, institution system 112 may use the random number generator to: (1) randomly determine a length for the validation number; (2) randomly determine a number of letters to include in the validation number, randomly determine those letters, and randomly assign each of those letters to a position within the validation number; (3) randomly determine a number of digits to include in the validation number, randomly determine those digits, and randomly assign each of those digits to a position within the validation number; and/or (4) randomly determine a number of wildcard characters to include in the validation number, randomly determine those wildcard characters, and randomly assign each of those wildcard characters to a position within the validation number.

In step 208 institution system 112 compares the randomly generated validation number 130 to historical validation numbers 130a through 130n stored in memory 120 to determine whether or not the validation number 130 already exists. If, in step 208 institution system 112 determines that validation number 130 already exists in memory 126, method 200 returns to step 206, where institution system 112 randomly generates a new validation number 130. If, in step 208 institution system 112 determines that validation number 130 does not already exist in memory 126, in step 210 institution system 112 transmit validation number 130 to second device 106. In step 212 second device 106 displays validation number 130 to user 104 on display 107. In response to second device 106 displaying validation number 130, user 104 may enter validation number 130 into a second field 140b of the webpage 116 that is displayed on first device 102.

In step 214 first device 102 determines whether user 104 has entered validation number 130 into second field 140b of webpage 116. If, in step 214 first device 102 determines that user 104 has entered validation number 130 into second field 140b, in step 216 first device 102 transmits validation number 130 to entity system 110 in transaction request 144. In step 218 entity system 110 determines whether or not it has received validation number 130. If, in step 218 entity system 100 determine that it has received validation number 130, in step 220 entity system 110 transmits the received validation number 130 to institution system 112 for authentication.

In step 222 institution system 112 determines whether or not the validation number 130 received from entity system 110 matches the copy of the original validation number 130 that institution system 112 transmitted to second device 106. In certain embodiments, institution system 112 additionally determines whether or not it has received the validation number within a threshold amount of time since it first generated the validation number (e.g., whether or not the validation number has expired). If, in step 222 institution system 112 determines that the validation number 130 received from entity system 110 does not match the copy of the validation number 130 stored in memory 126 and/or that the validation number 130 has been received after the threshold amount of time since it was first generated, in step 226 institution system 112 generates message 148 instructing entity system 110 to decline user 104's transaction request 144. If, in step 222 institution system 112 determines that the validation number 130 received from entity system 110 matches the copy of the validation number 130 stored in memory 126 and, in certain embodiments, that the validation number 130 was received within the threshold time since its creation, in step 224 institution system generates message 148 instructing entity system 110 to approve user 104's transaction request 144. In step 228 institution system 112 transmits message 148 to entity system 110. In certain embodiments, in step 230 institution system 112 also sends instructions to second device 106 to delete any copies of validation number 130, such that validation number 130 is no longer available on second device 106. In response to receiving such instructions, second device 102 deletes validation number 130, in step 232. In step 234 entity system 110 transmits transaction result message 142 to first device 102. Transaction result message 142 may include any suitable information. As an example, in certain embodiments in which institution system 112 transmitted an authentication result message 148 to entity system 110 instructing entity system 110 to deny the requested transaction, transaction result message 142 may indicate that entity system 110 has denied the transaction. As another example, in certain embodiments in which institution system 112 transmitted an authentication result message 148 to entity system 110 instructing entity system 110 to approve the transaction request 144, entity system 110 may have used account number 136 to process the transaction. In such embodiments, transaction result message 142 may indicate that entity system has processed the transaction, and may include information such as a confirmation number. In step 236, in response to receiving transaction result message 142, first device 102 displays the contents of transaction result message 142 on display 114. For example, first device 102 may display a message to user 104 on display 114 indicating that entity system 110 has approved or declined the transaction.

Modifications, additions, or omissions may be made to method 200 depicted in FIGS. 2A and 2B. Method 200 may include more, fewer, or other steps. For example, steps may be performed in parallel or in any suitable order. While discussed as first device 102, second device 106, institution system 112, and entity system 110 (or components thereof) performing certain steps, any suitable components of system 100, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
   a first subsystem associated with an institution, the first subsystem comprising:
   a memory; and
   a hardware processor communicatively coupled to the memory, the hardware processor configured to:
   receive, from a first user device, a request for a first validation number, wherein:
   a webpage is displayed on the first user device comprising a first field configured to receive an account number, a second field configured to receive an expiry date and a third field configured to receive a card verification value number;
   the first user device transmitted the request for the first validation number in response to a determination that the account number is entered into the first field;
   in response to the determination that the account number is entered into the first field, the second field and the third field are automatically replaced with a fourth field configured to receive the first validation number;

the webpage is associated with an entity; and
the account number corresponds to an account held at the institution; and
in response to receiving the request for the first validation number:
randomly generate the first validation number;
store a copy of the first validation number in the memory;
determine whether the first validation number already exists in the memory;
in response to determining that the first validation number already exists in the memory, randomly generate a new validation number; and
in response to determining that the first validation number is not in the memory, transmit the first validation number to a second user device associated with the account, the second user device being different from the first user device; and
a second subsystem associated with the entity, the second subsystem comprising a hardware processor configured to:
receive, from the first user device, a request for a transaction, the request for the transaction comprising the first validation number, wherein the first user device transmitted the request for the transaction in response to:
the second user device receiving the first validation number; and
the first validation number being entered into the fourth field of the webpage displayed on the first user device; and
transmit the first validation number received in the request for the transaction to the first subsystem, wherein, in response to receiving the first validation number, the hardware processor of the first subsystem is further configured to:
determine that the first validation number received from the second subsystem matches the copy of the first validation number stored in the memory;
in response to determining that the first validation number received from the second subsystem matches the copy of the first validation number stored in the memory, transmit a message to the second subsystem authorizing the transaction; and
in response to determining that the first validation number received from the second subsystem matches the copy of the first validation number stored in the memory, transmit a message to the second user device instructing the second user device to delete the first validation number.

2. The system of claim 1, wherein the hardware processor of the second subsystem is further configured to:
receive, from a third user device, a request for a second transaction, the request for the second transaction comprising a second validation number; and
in response to receiving the request for the second transaction, transmit the second validation number to the first subsystem, wherein, in response to receiving the second validation number, the hardware processor of the first subsystem is further configured to:
determine that the second validation number does not match any validation numbers stored in the memory; and
in response to determining that the second validation number does not match any validation numbers stored in the memory, transmit a second message to the second subsystem instructing the second subsystem to decline the second transaction.

3. The system of claim 1, wherein the second user device is configured to receive the first validation number from the first subsystem in at least one of:
an SMS message;
an email message; and
a pop-up message generated by an application installed on the second user device.

4. The system of claim 1, wherein:
the first validation number is an alphanumeric number; and
randomly generating the first validation number comprises at least one of:
randomly determining a length of the first validation number;
randomly determining a number of letters to include in the first validation number;
randomly determining a number of digits to include in the first validation number;
randomly determining a number of wildcard characters to include in the first validation number;
randomly determining a digit and a position of the digit within the first validation number;
randomly determining a letter and a position of the letter within the first validation number; and
randomly determining a wildcard character and a position of the wildcard character within the first validation number.

5. The system of claim 1, wherein:
the first user device is the same as the second user device; and
in response to receiving the first validation number from the first subsystem, the first user device is configured to automatically populate the fourth field of the webpage with the first validation number.

6. The system of claim 1, wherein:
in response to receiving the first validation number, the hardware processor of the first subsystem is further configured to determine that an amount of time since the first validation number was generated is less than a threshold length of time; and
transmitting the message to the second subsystem authorizing the transaction is further performed in response to determining that the amount of time since the first validation number was generated is less than the threshold length of time.

7. A method comprising:
receiving, from a first user device, a request for a first validation number, wherein:
a webpage is displayed on the first user device comprising a first field configured to receive an account number, a second field configured to receive an expiry date and a third field configured to receive a card verification value number;
the first user device transmitted the request for the first validation number in response to a determination that the account number is entered into the first field;
in response to the determination that the account number is entered into the first field, the second field and the third field are automatically replaced with a fourth field configured to receive the first validation number;
the webpage is associated with an entity; and
the account number corresponds to an account held at an institution;

in response to receiving the request for the first validation number:
  randomly generating the first validation number;
  storing a copy of the first validation number in a storage location;
  determine whether the first validation number already exists in a memory;
  in response to determining that the first validation number already exists in the memory, randomly generate a new validation number; and
  in response to determining that the first validation number is not in the memory, transmitting the first validation number to a second user device associated with the account, the second user device being different from the first user device;
receiving the first validation number from a system associated with the entity, the first validation number received by the system as part of a request for a transaction transmitted by the first user device, wherein the first user device transmitted the request for the transaction in response to:
  the second user device receiving the first validation number; and
  the first validation number being entered into the fourth field of the webpage displayed on the first user device;
determining that the first validation number received from the system matches the copy of the first validation number stored in the storage location;
in response to determining that the first validation number received from the system matches the copy of the first validation number stored in the storage location, transmitting a message to the system authorizing the transaction; and
in response to determining that the first validation number received from the system matches the copy of the first validation number stored in the storage location, transmitting a message to the second user device instructing the second user device to delete the first validation number.

8. The method of claim 7, further comprising:
receiving a second validation number from the system, the second validation number received by the system as part of a request for a second transaction transmitted by a third user device;
determining that the second validation number does not match any validation numbers stored in the storage location; and
in response to determining that the second validation number does not match any validation numbers stored in the storage location, transmitting a second message to the system instructing the system to decline the second transaction.

9. The method of claim 7, wherein transmitting the first validation number to the second user device comprises at least one of:
transmitting an SMS message to the second user device;
transmitting an email message to an email account of a user of the second user device; and
transmitting the first validation number to an application installed on the second user device, wherein, in response to receiving the first validation number, the application is configured to generate a pop-up message on a display of the second user device, the pop-up message comprising the first validation number.

10. The method of claim 7, wherein:
the first validation number is an alphanumeric number; and
randomly generating the first validation number comprises at least one of:
  randomly determining a length of the first validation number;
  randomly determining a number of letters to include in the first validation number;
  randomly determining a number of digits to include in the first validation number;
  randomly determining a number of wildcard characters to include in the first validation number;
  randomly determining a digit and a position of the digit within the first validation number;
  randomly determining a letter and a position of the letter within the first validation number; and
  randomly determining a wildcard character and a position of the wildcard character within the first validation number.

11. The method of claim 7, wherein:
the first user device is the same as the second user device; and
the first validation number being entered into the fourth field of the webpage displayed on the first user device comprises the first user device automatically populating the fourth field of the webpage with the first validation number.

12. The method of claim 7, further comprising, in response to receiving the first validation number, determining that an amount of time since the first validation number was generated is less than a threshold length of time, wherein transmitting the message to the system authorizing the transaction is further performed in response to determining that the amount of time since the first validation number was generated is less than the threshold length of time.

13. An apparatus associated with an institution, the apparatus comprising:
a memory; and
a hardware processor communicatively coupled to the memory, the hardware processor configured to:
  receive, from a first user device, a request for a first validation number, wherein:
    a webpage is displayed on the first user device comprising a first field configured to receive an account number, a second field configured to receive an expiry date and a third field configured to receive a card verification value number;
    the first user device transmitted the request for the first validation number in response to a determination that the account number is entered into the first field;
    in response to the determination that the account number is entered into the first field, the second field and the third field are automatically replaced with a fourth field configured to receive the first validation number;
    the webpage is associated with an entity; and
    the account number corresponds to an account held at the institution;
  in response to receiving the request for the first validation number:
    randomly generate the first validation number;
    store a copy of the first validation number in the memory;
    determine whether the first validation number already exists in the memory;

in response to determining that the first validation number already exists in the memory, randomly generate a new validation number; and in response to determining that the first validation number is not in the memory, transmit the first validation number to a second user device associated with the account, the second user device being different from the first user device;

receive, from a system associated with the entity, the first validation number, wherein the system received the first validation number from the first user device as part of a request for a transaction, the request for the transaction transmitted by the first user device in response to:

the second user device receiving the first validation number; and the first validation number being entered into the fourth field of the webpage displayed on the first user device;

determine that the first validation number received from the system matches the copy of the first validation number stored in the memory;

in response to determining that the first validation number received from the system matches the copy of the first validation number stored in the memory, transmit a message to the system authorizing the transaction; and in response to determining that the first validation number received from the system matches the copy of the first validation number stored in the memory, transmit a message to the second user device instructing the second user device to delete the first validation number.

14. The apparatus of claim 13, wherein the hardware processor is further configured to:

receive a second validation number from the system, the second validation number received by the system as part of a request for a second transaction transmitted by a third user device;

determine that the second validation number does not match any validation numbers stored in the memory; and in response to determining that the second validation number does not match any validation numbers stored in the memory, transmit a second message to the system instructing the system to decline the second transaction.

15. The apparatus of claim 13, wherein transmitting the first validation number to the second user device comprises at least one of:

transmitting an SMS message to the second user device;

transmitting an email message to an email account of a user of the second user device; and transmitting the first validation number to an application installed on the second user device, wherein, in response to receiving the first validation number, the application is configured to generate a pop-up message on a display of the second user device, the pop-up message comprising the first validation number.

16. The apparatus of claim 13, wherein:

the first validation number is an alphanumeric number; and randomly generating the first validation number comprises at least one of:

randomly determining a length of the first validation number;

randomly determining a number of letters to include in the first validation number;

randomly determining a number of digits to include in the first validation number;

randomly determining a number of wildcard characters to include in the first validation number;

randomly determining a digit and a position of the digit within the first validation number;

randomly determining a letter and a position of the letter within the first validation number; and randomly determining a wildcard character and a position of the wildcard character within the first validation number.

17. The apparatus of claim 13, wherein:

in response to receiving the first validation number, the hardware processor is further configured to determine that an amount of time since the first validation number was generated is less than a threshold length of time; and transmitting the message to the system authorizing the transaction is further performed in response to determining that the amount of time since the first validation number was generated is less than the threshold length of time.

\* \* \* \* \*